United States Patent
Itamoto

(10) Patent No.: US 9,661,605 B2
(45) Date of Patent: May 23, 2017

(54) POSTING-STATUS NOTIFICATION SYSTEM, INFORMATION COMMUNICATION TERMINAL, POSTING-STATUS NOTIFICATION METHOD, AND PROGRAM

(71) Applicant: NEC CASIO Mobile Communications, Ltd., Kawasaki-shi, Kanagawa (JP)

(72) Inventor: Shinichi Itamoto, Kawasaki (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/429,192

(22) PCT Filed: Sep. 26, 2013

(86) PCT No.: PCT/JP2013/076066
§ 371 (c)(1),
(2) Date: Mar. 18, 2015

(87) PCT Pub. No.: WO2014/050968
PCT Pub. Date: Apr. 3, 2014

(65) Prior Publication Data
US 2015/0249968 A1    Sep. 3, 2015

(30) Foreign Application Priority Data

Sep. 26, 2012  (JP) .................................. 2012-212861

(51) Int. Cl.
*H04W 68/00* (2009.01)
*G06F 17/30* (2006.01)
*G06Q 50/00* (2012.01)

(52) U.S. Cl.
CPC ........ *H04W 68/00* (2013.01); *G06F 17/3089* (2013.01); *G06Q 50/01* (2013.01)

(58) Field of Classification Search
CPC .... H04W 68/00; G06F 17/3089; G06Q 50/01
(Continued)

(56) References Cited

U.S. PATENT DOCUMENTS

2006/0259938 A1* 11/2006 Kinoshita .......... H04N 21/4622
                                                              725/118
2011/0030011 A1*  2/2011 Choi ................. H04N 5/44543
                                                              725/45
(Continued)

FOREIGN PATENT DOCUMENTS

JP    2001-067359 A    3/2001
JP    2002-007293 A    1/2002
(Continued)

OTHER PUBLICATIONS

International Search Report for PCT Application No. PCT/JP2013/076066, mailed on Dec. 10, 2013.
(Continued)

*Primary Examiner* — Khai M Nguyen

(57) ABSTRACT

A posting-status notification system includes: a determination unit that determines whether or not a posting status of posting information being associated with a content satisfies a predetermined notification condition, the posting information being posting information posted on a network; and an instruction unit that instructs an output unit to output the posting status in a case where the determination unit determines that the posting status satisfies the notification condition.

10 Claims, 17 Drawing Sheets

(58) Field of Classification Search
USPC .............................................. 455/458, 414.1
See application file for complete search history.

(56) References Cited

U.S. PATENT DOCUMENTS

| | | | |
|---|---|---|---|
| 2012/0011103 A1* | 1/2012 | Joo | G06F 17/30864 707/687 |
| 2012/0030587 A1* | 2/2012 | Ketkar | G06F 17/30038 715/751 |
| 2013/0031585 A1* | 1/2013 | Itagaki | H04N 21/4126 725/49 |
| 2013/0117389 A1* | 5/2013 | Yamada | G08G 1/09675 709/206 |
| 2013/0282839 A1* | 10/2013 | Alcala | H04N 21/4788 709/206 |
| 2014/0046804 A1* | 2/2014 | Nadjarian | G06Q 30/0625 705/26.62 |
| 2014/0068650 A1* | 3/2014 | Kim | H04N 13/0059 725/19 |
| 2015/0026744 A1* | 1/2015 | Itamoto | H04H 60/27 725/110 |
| 2015/0234787 A1* | 8/2015 | Itamoto | G06F 17/211 715/204 |

FOREIGN PATENT DOCUMENTS

| | | |
|---|---|---|
| JP | 2002-279026 A | 9/2002 |
| JP | 2005-223534 A | 8/2005 |
| JP | 2005-328219 A | 11/2005 |
| JP | 2005-346494 A | 12/2005 |
| JP | 2007-060305 A | 3/2007 |
| JP | 2007-531122 A | 11/2007 |
| JP | 2009-212630 A | 9/2009 |
| JP | 2010-141484 A | 6/2010 |
| JP | 2012-175318 A | 9/2012 |
| WO | 2012/116236 A2 | 8/2012 |

OTHER PUBLICATIONS

Japanese Office Action for JP Application No. 2012-212861 mailed on Jul. 15, 2014 with English Translation.
Extended European Search Report for EP Application No. EP13840615.2 dated Apr. 22, 2016.

* cited by examiner

FIG. 6

| CONTENT NAME | CONTENT ID | BROADCASTING TIME SLOT | BROADCASTING STATION | CONTENT DATA FILE NAME | CONTENT-ACCOMPANYING INFORMATION |
|---|---|---|---|---|---|
| GAME OF JAPAN NATIONAL SOCCER TEAM | C001 | 2012.08.08  19:00–21:00 | STATION A | DATA FILE F1 | COMMENTATOR: · · · PERFORMER: · · · |
| TODAY'S COOKING LESSON | C002 | 2012.08.08  19:00–20:00 | STATION B | DATA FILE F2 | · · · |
| Comedy ○○ | C003 | 2012.08.08  20:00–21:00 | STATION B | DATA FILE F3 | · · · |
| | | | | | |
| | | | | | |
| | | | | | |

231

| POSTER ID | POSTING TIME INFORMATION | POSTING INFORMATION | CONTENT ASSOCIATED INFORMATION |
|---|---|---|---|
| 111 | 2012.08.08  19:15 | · · · · · · · · · · | SOCCER |
| 222 | 2012.08.08  19:20 | · · · · · · · · · · | STATION B |
| 333 | 2012.08.08  19:22 | · · · · · · · · · · | COMEDY |
| 444 | 2012.08.08  19:25 | · · · · · · · · · · | #soccer |
| 555 | 2012.08.08  19:26 | · · · · · · · · · · | #stationA |
| 111 | 2012.08.08  19:30 | · · · · · · · · · · | #stationB |
| 333 | 2012.08.08  19:35 | · · · · · · · · · · | COOKING |
|  |  |  |  |
|  |  |  |  |
|  |  |  |  |

| POSTING STATUS | CONTENT | ANALYSIS TIME INFORMATION |
|---|---|---|
|  |  |  |
|  |  |  |
|  |  |  |
|  |  |  |
|  |  |  |
|  |  |  |
|  |  |  |
|  |  |  |
|  |  |  |

| CONTENT KEYWORD INFORMATION | REGISTRATED HASHTAG | RELEVANT WORD |
|---|---|---|
| SOCCER | #soccer | SOCCER, FIELD, GOAL KEEPER, DEFENDER, MIDFIELDER, FORWARD, VOLANTE… |
| WOMEN'S SOCCER | #womenssoccer | ××× JAPAN, WASA, SHIMIZUIWA, SUMIKAWA, ONO, KADOYAMA… |
| MEN'S SOCCER | #menssoccer | ○○○ BLUE, JAPAN NATIONAL TEAM, △ LEAGUE, DAHON, TOMONAGA, DAYOSHI, SHIMAYOSHI, BEHAEE, GAWAKA… |
| | | |
| | | |

| POSTING HASHTAG | NUMBER OF POSTINGS |
|---|---|
| #soccer | 1589 |
| #baseball | 3965 |
| | |
| | |
| | |
| | |

POSTING-STATUS NOTIFICATION SYSTEM, INFORMATION COMMUNICATION TERMINAL, POSTING-STATUS NOTIFICATION METHOD, AND PROGRAM

This application is a National Stage Entry of PCT/JP2013/076066 filed on Sep. 26, 2013, which claims priority from Japanese Patent Application 2012-212861 filed on Sep. 26, 2012, the contents of all of which are incorporated herein by reference, in their entirety.

TECHNICAL FIELD

The present invention relates to a posting-status notification system, an information communication terminal, a posting-status notification method, and a program.

BACKGROUND ART

In recent years, mobile terminals such as smartphones and tablet terminals are prevailing. An example of a type of these mobile terminals is a mobile terminal having a function for receiving television airwaves and a function for connecting to the Internet (for example, refer to Patent Document 1). Users, with use of this mobile terminal, can browse and view television contents and music contents. The users, with use of the mobile terminal, are sharing their recent status and current thoughts on the web by posting images and text data, using social networking services such as Twitter (registered trademark) and Facebook (registered trademark).

PRIOR ART DOCUMENTS

Patent Document

[Patent Document 1] Japanese Unexamined Patent Application, First Publication No. 2010-141484

SUMMARY OF THE INVENTION

Problem to be Solved by the Invention

However, it is difficult for a user to constantly monitor posting information, which is added on a real-time basis. Therefore, it has been difficult for a user to grasp which content is drawing attention. Moreover, it has been difficult for a user to grasp what kinds of posts are being made by users viewing the content that is drawing attention. Furthermore, it has been difficult for a user to grasp the degree to which posting information are being posted.

An exemplary object of the present invention is to provide a posting-status notification system, an information communication terminal, a posting-status notification method, and a program capable of solving the above problems.

Means for Solving the Problem

A posting-status notification system according to an exemplary aspect of the present invention includes: a determination unit that determines whether or not a posting status of posting information being associated with a content satisfies a predetermined notification condition, the posting information being posting information posted on a network; and an instruction unit that instructs an output unit to output the posting status in a case where the determination unit determines that the posting status satisfies the notification condition.

An information communication terminal according to an exemplary aspect of the present invention includes: a determination unit that determines whether or not a posting status of posting information being associated with a content satisfies a predetermined notification condition, the posting information being posting information posted on a network; an instruction unit that instructs an output unit to output the posting status in a case where the determination unit determines that the posting status satisfies the notification condition; and an output unit that outputs the posting information by means of at least any one of sound, light, vibration, and image when the instruction unit instructs an output of the posting status.

A posting-status notification method according to an exemplary aspect of the present invention includes: determining whether or not a posting status of posting information being associated with a content satisfies a predetermined notification condition, the posting information being posting information posted on a network; and instructing an output unit to output the posting status in a case where it is determined that the posting status satisfies the notification condition.

A program according to an exemplary aspect of the present invention causes a computer to function as: a determination unit that determines whether or not a posting status of posting information being associated with a content satisfies a predetermined notification condition, the posting information being posting information posted on a network; and an instruction unit that instructs an output unit to output the posting status in a case where the determination unit determines that the posting status satisfies the notification condition.

Effect of the Invention

According to an exemplary embodiment of the present invention, in the case where a posting status is determined as being highly active, a user can be notified of the posting status by means of such as image, sound, light, or vibration.

BRIEF DESCRIPTION OF THE DRAWINGS

FIG. 6 is a diagram showing an example of a content data table according to the first exemplary embodiment of the present invention.

FIG. 17 is a diagram showing an example of a content-associated hashtag table according to the third exemplary embodiment of the present invention.

FIG. 18 is a diagram showing an example of a posting hashtag table according to the third exemplary embodiment of the present invention.

EMBODIMENTS FOR CARRYING OUT THE INVENTION

[First Exemplary Embodiment]

Figure 1:
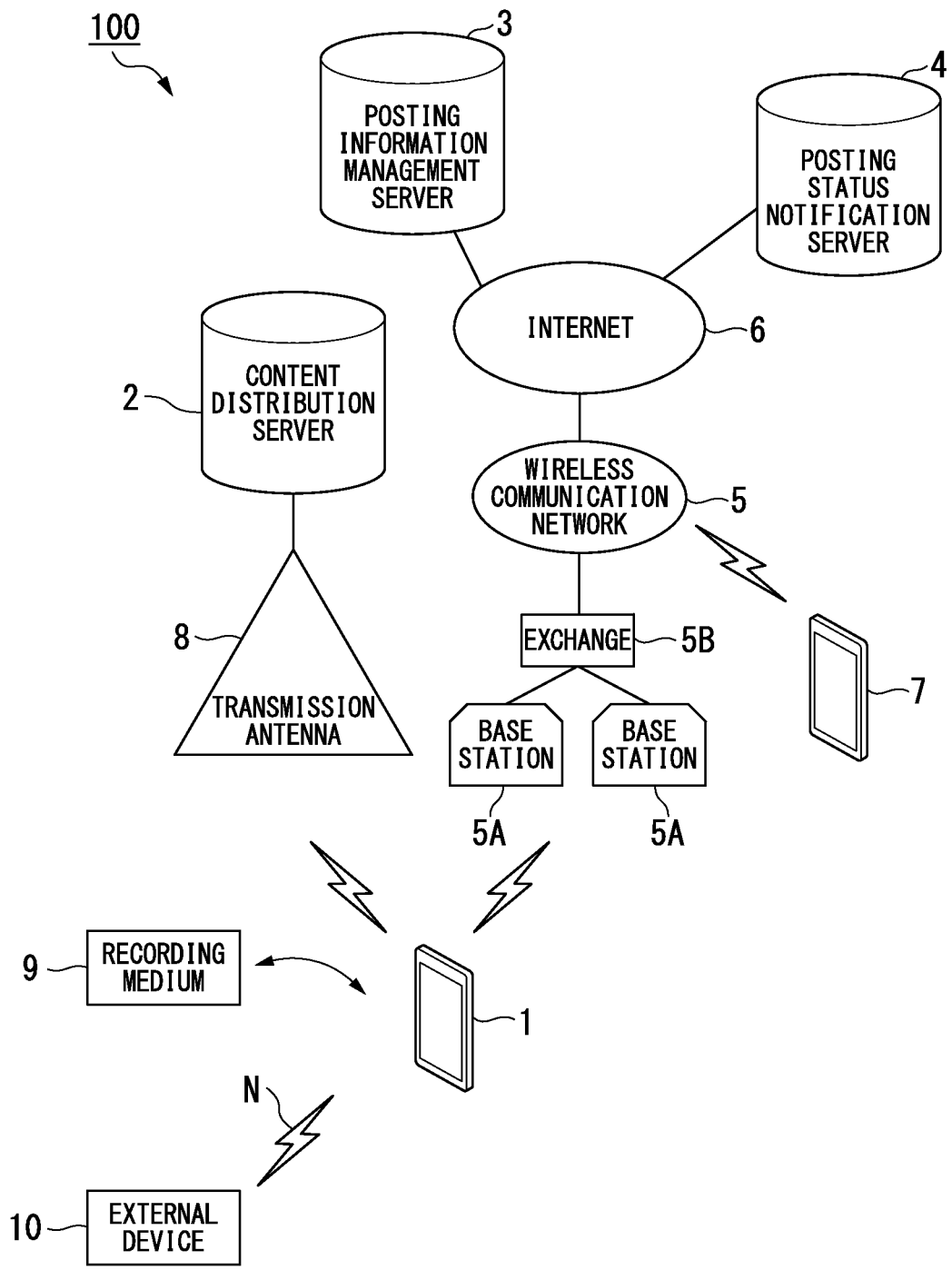
FIG. 1 is a diagram showing a brief overview of a posting-status notification system according to a first exemplary embodiment of the present invention.

Hereunder, exemplary embodiments of the present invention are described, with reference to the drawings. FIG. 1 is a diagram showing a brief overview of a posting-status notification system 100 according to a first exemplary embodiment of the present invention.

This posting-status notification system 100 is a system that provides a service of analyzing a posting status and, when a predetermined notification condition is satisfied, notifying a predetermined audience of the posting status. This posting-status notification system 100 primarily includes a mobile terminal 1, a content distribution server 2, a posting information management server 3, and a posting status notification server 4.

The content distribution server 2 is a server that distributes contents, which are viewing information for viewers. The content distribution server 2 may, for example, be provided with a database that stores content data of program contents provided by a television broadcasting station. This content distribution server 2 distributes content data stored therein to a mobile terminal 1 at a predetermined timing.

In the present exemplary embodiment, the content distribution server 2 employs two types of distribution methods. A first distribution method is a method in which a broadcasting content to be broadcasted is distributed based on a predetermined time table. A second distribution method is a method in which a reproduction content to be transmitted to the request origin is distributed according to viewer's request. The content data distributed by means of each of these distribution methods is the same data, and is stored in a memory unit within the content distribution server 2.

When executing the distribution method for distributing content data of a broadcasting content, the content distribution server 2 can simultaneously broadcast content data of several contents to a number of subscribing terminals. Accordingly, in a case where a mobile terminal 1 is subscribing to a broadcasting content distribution service, or where the mobile terminal 1 is a terminal to which provision of this service is permitted, the mobile terminal 1 receives content data of a broadcasting content specified by the user, and can reproduce the data. Therefore, the user, by specifying a channel, can obtain only the content data of the specified content among several contents that are broadcasted at the specified time, and reproduce the data on the mobile terminal 1.

When executing the distribution method for distributing content data of a reproduction content, the content distribution server 2 distributes content data of a requested reproduction content to a terminal that transmitted a distribution request requesting distribution of the reproduction content. To describe specifically, the content distribution server 2 receives, from the subscribing terminal, terminal identification information for identifying each terminal (hereunder, referred to as terminal ID) and content associated information that is associated with the reproduction content, as well as the distribution request for requesting distribution of the reproduction content. When these pieces of information are received, the content distribution server 2 distributes the content data of the reproduction content indicated by the content associated information, to the terminal of the distribution request origin (the terminal indicated by the terminal ID). The terminal of the distribution request origin receives the content data of the reproduction content from the content distribution server 2, and reproduces the data.

The content associated information is a piece of information associated with a content. The content associated information may also, for example, include information indicating a character sequence and/or a hashtag, that indicates a television broadcasting station name and/or a program name to indicate the contents of the content. The content associated information may also include a character sequence and/or a hashtag that indicates the content and/or performers of the content, and/or a keyword relevant to the contents of the content, and/or information that indicates the broadcasting time slot or distribution time slot of the content.

A hashtag refers to classification information used in Twitter (registered trademark). In the case where posting information including a hashtag is posted, the posting information that includes the hashtag can be classified out of other posting information that does not include the hashtag. A hashtag is used as a search key when searching from among several pieces of posting information for only posting information that includes the hashtag. Searching with use of a hashtag as a search key is beneficial in those cases where a user has a positive intention to post relevant information shown by a hashtag. For example, with use of a search with a keyword included in posting information, it is also possible to search for posting information relevant to the keyword. However, without posting a character sequence including this keyword as posting information, it is not possible to search for the posting information. Accordingly, without use of a hashtag, posting with a free character sequence is compromised. Moreover, if the written text and keyword to be posted are notated equally, the keyword may compromise understanding of the content of the written text to be posted in some cases. Therefore, a hashtag is used as a method for associating pieces of posting information with each other without using a keyword. This hashtag is a piece of information in which a hash symbol "#" is added in front of a character sequence notated with alphanumeric characters, Chinese characters, Japanese Hiragana characters, and/or Japanese Katakana Characters. As a hashtag format, a white space is input immediately before the hash symbol and immediately after the character sequence. The format of the hashtag other than this rule may be freely decided by a user. As a result, a character sequence that serves as a keyword may be decided by a user and may be generated by a user.

The posting information management server 3 includes a database that stores posting information posted on the web (the World Wide Web (WWW), a network). The posting information management server provides this posting information to a mobile terminal 1. This posting information management server 3 may provide, for example, a posting web service for browsing posting information posted on the web, creating posting information, and/or posting the created posting information to the web.

To describe specifically, the posting information management server 3 collects posting information of service subscribers that subscribe to this posting web service, and transmits the posting information of the request target to the terminal belonging to the service subscriber, if there is a browsing request from the service subscriber.

When posting information is acquired from a mobile terminal 1, the posting information management server 3 associates posting time information with the posting information, and stores each piece of information in the memory unit of its own. In the case where the content associated information that specifies content data distributed from the content distribution server 2 is included in the posting information, the posting information management server 3 associates the content associated information with each of the posting information and the posting time information, and stores each piece of information in the memory unit of its own. The posting information management server 3, in some cases, may receive posting information with no content associated information associated therewith. In this case, the posting information management server 3 associates the posting time information with the posting information, and stores each piece of information in the memory unit of its own.

The posting time information is a piece of information that indicates a time or period at/during which posting information is posted. The posting time information, for example, may be a piece of information that indicates a time at which the posting information management server 3 received posting information, and it may be a piece of information that indicates a time of transmission made by a mobile terminal 1 that transmitted the posting information. Moreover, the posting time information may be a piece of information that indicates a timing at which a post is made for a content. The posting time information, for example, may be a piece of information that indicates a reproduction position of a broadcasting content broadcasted when the posting information was posted (hereunder, referred to as content time information). The posting time information may be a piece of information that indicates a reproduction position of a reproduction content broadcasted on a mobile terminal 1 when the posting information was posted (hereunder, referred to as content time information).

The posting status notification server 4 analyzes the posting status of the posting information based on the posting information stored in the database of the posting information management server 3. This posting status notification server 4, according to the posting status, notifies the mobile terminal 1 of this posting status. To describe specifically, the posting status notification server 4 determines whether or not the posting status satisfies a predetermined notification condition. When the posting status is determined as satisfying the notification condition, the posting status notification server 4 notifies the mobile terminal 1 of the posting status.

This posting status notification server 4, for example, may analyze changes in the number of posts per unit time of posting information associated with content associated information, among the posting information posted on the posting information management server 3.

The posting status notification server 4 is configured so that when a notification condition is satisfied, it transmits the analyzed posting status (analysis result) to the terminal of a subscriber of the posting status notification service. Examples of the notification condition include a case where the number of posts per unit time exceeds a predetermined threshold value, and a case where the change rate of the number of posts per unit time becomes an increase rate of a predetermined threshold value or greater.

In the following description, it is assumed that the terminal of the posting status notification service subscriber is a terminal belonging to a posting service subscriber, and it is a terminal that is capable of viewing contents distributed from the content distribution server 2.

In FIG. 1, upon connecting to a wireless communication network (mobile communication network) 5 via a closest base station 5A and an exchange 5B, the mobile terminal 1 becomes able to establish a voice call with another mobile terminal 7 via this wireless communication network 5. When connected to the Internet 6 via the wireless communication network 5, the mobile terminal 1 can access and browse websites. The mobile terminal 1 is also capable of streaming, in which content data such as movie, still image, music, news, and multimedia including music are downloaded from the content distribution server 2 via the Internet 6 and the wireless communication network 5, and reproduced.

By receiving terrestrial digital broadcasting content data transmitted from the content distribution server 2 via a transmission antenna 8, the mobile terminal 1 acquires content data provided by a television broadcasting station. Like Internet radio, the mobile terminal 1 can also download and receive digital broadcasting from the content distribution server 2 via the wireless communication network 5 and the Internet 6. In this manner, the mobile terminal 1 can receive content data of a broadcasting content via a television function, and can download streaming content data via an Internet connection function. The mobile terminal 1 can acquire various types of contents from a recording medium 9 such as a freely removable portable memory card. Moreover, the mobile terminal 1 can acquire various types of content data from an external device 10 via short distance communication (reference symbol N in FIG. 1) such as Bluetooth (registered trademark) communication and infrared communication.

In the present exemplary embodiment, there is described an example of applying a mobile terminal 1 as a posting information notification device. However, the exemplary embodiment of the present invention is not limited to this example. The posting information notification device may be a smartphone, a portable game console, a PDA (personal digital assistant), a tablet type PC (personal computer), or a notebook type PC.

The mobile terminal 1 may include, for example, a voice communication function, an electronic mail function, an Internet connection function (web access function), a television function for receiving and viewing digital television broadcasting (such as one-segment terrestrial digital television broadcasting), and a video recording function. The video recording function is a function for video recording (including audio recording, and the same applies hereafter) contents received via television broadcasting. The video recording function is not limited to a function to perform video recording, and it also includes a content recording function for performing audio recording.

Figure 2:
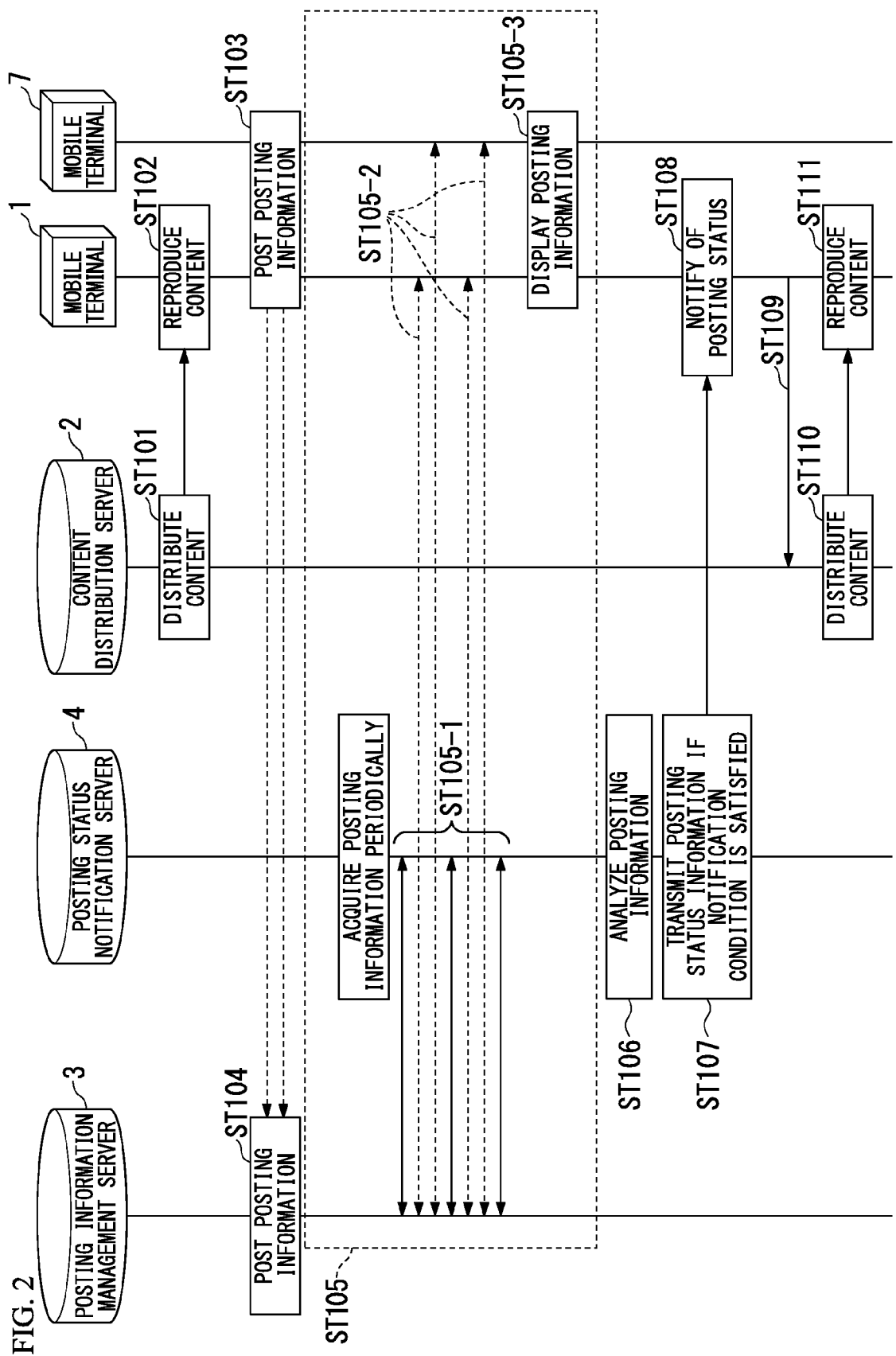
FIG. 2 is a sequence diagram for describing the brief overview of the posting-status notification system according to the first exemplary embodiment of the present invention.

Next is described a brief overview of the posting-status notification system 100 according to the present exemplary embodiment, with reference to FIG. 2. FIG. 2 is a sequence diagram for describing the brief overview of the posting-status notification system 100 according to the present exemplary embodiment. As an example, here is described a distribution method in which the content distribution server 2 distributes broadcasting content.

(Step ST101)

For example, in the case where the current time reaches a broadcasting time slot, the content distribution server 2 reads the content data of the terrestrial digital broadcasting content from the memory unit of its own, and transmits the data via the transmission antenna 8.

(Step ST102)

The mobile terminal 1 receives and reproduces this broadcasting content content data, and outputs the video and audio from the display and speaker of its own.

(Step ST103)

Next is described a case where posting information is posted from the mobile terminal 1 that is reproducing the content, and from the mobile terminal 7. In this case, the mobile terminal 1 and the mobile terminal 7 transmit, to the posting information management server 3, information in which a poster ID that indicates the post submitter is associated with the posting information. This poster ID may be a terminal ID assigned to each terminal. The mobile terminal 1 may transmit, to the posting information management server 3, the posting information that includes content associated information relevant to the content being reproduced. For example, as content associated information, the mobile terminal 1 may transmit, to the posting information management server 3, the posting information that includes the channel number of the broadcasting content being reproduced.

(Step ST104)

For example, the posting information management server 3 acquires the time at which the posting time information is received as a posting time, and it associates the posting time information indicating this posting time, the received posting information, and the poster ID with each other and registers each piece of information in the memory unit of its own.

At this time, the posting information management server 3 determines whether or not the received posting information includes content associated information. If it is determined that content associated information is included, the posting information management server 3 associates this content associated information with the posting information, and registers each piece of information in the memory unit of its own.

For example, it is assumed that the posting information includes information indicating a character sequence and/or a hashtag that indicates a television broadcasting station name and/or a program name. In this case, the posting information management server 3 determines, among the contents being broadcasted at the current time, the content corresponding to the television broadcasting station name and/or program name included in the posting information as being the content that is associated with the posting information. Furthermore, the posting information management server 3 acquires content associated information indicating the content that has been determined as the associated content.

Moreover, the posting information management server 3 determines whether or not the posting information includes a character sequence and/or a hashtag that indicates information included in the information accompanying the content being broadcasted at the current time (for example, written text that describes the content of the content, a performer, and/or a relevant keyword). In the case where the information included in this content-accompanying information is included in the posting information, the posting information management server 3 determines this content as being a content that is associated with the posting information. Furthermore, the posting information management server 3 acquires content associated information indicating the content that has been determined as the associated content. A content attribute information may be text data that is associated with a terrestrial digital broadcasting content. In general, with this terrestrial digital broadcasting content, there is associated content-accompanying information to be displayed on an electronic program table.

(Step ST105)

The posting status notification server 4 periodically acquires posting information from the posting information management server 3 (step ST105-1). For example, the posting status notification server 4, every time when a predetermined period of time has elapsed, transmits to the posting information management server 3 a request command for requesting a transmission of updated posting information. This posting status notification server 4, for example, may request a transmission of posting information posted in the last ten minutes, among the posting information registered in the posting information management server 3. The posting status notification server 4 may request, for each content, a transmission of the posting information that is associated with the predetermined content associated information, among the posting information posted within the last ten minutes. The posting status notification server 4 may request a transmission of posting information posted from a specific poster, for each piece of attribute information of the poster.

Upon receiving this request command, the posting information management server 3 reads from the memory unit of its own the posting information according to the request of the posting status notification server 4, and transmits the posting information to the posting status notification server 4.

As a result, in the case where the mobile terminal 1 and the mobile terminal 7 post posting information, the posting information are registered in the posting information management server 3, and the posting status notification server 4 can acquire the posting information updated on the posting information management server 3.

As with the posting status notification server 4, the mobile terminal 1 and the mobile terminal 7 can transmit a request command for requesting a posting information transmission to the posting information management server 3. The posting information management server 3 transmits posting information according to the request command to the mobile terminal 1 and the mobile terminal 7, which are the origins of the request (step ST105-2). Upon receiving the posting information from the posting information management server 3, the mobile terminal 1 and the mobile terminal 7 display the received posting information on the display of their own.
(Step ST106)

The posting status notification server 4 analyzes the posting status based on the posting information received from the posting information management server 3. The posting status notification server 4 determines whether or not the analyzed posting status (analysis result) satisfies a predetermined notification condition.

The posting status indicates a status where posting information is posted from such as the mobile terminal 1 and/or the mobile terminal 7. The posting status may, for example, indicate whether or not posting is in a highly active state (where posting is becoming highly active). The state where posting is highly active refers to a state where the number of posting information posts is rapidly increasing. Determination criteria for determining whether or not the number of posts is large or has increased may be a relative evaluation within several contents that are being broadcasted, and it may also be an absolute evaluation based on a comparison with a predetermined threshold value.

The notification condition is a condition that is preliminarily determined as a condition for the case of notifying a user of a posting status. For example, in the case where the posting status is determined as being highly active in the broadcasting content that is currently broadcasted, a notification of the posting status of the content, for which the posting status is determined as being highly active, may be defined as a notification condition.
(Step ST107)

When the posting status satisfies the notification condition, the posting status notification server 4 transmits posting status information indicating the posting status to the mobile terminal 1. The posting status notification server 4 transmits to the mobile terminal 1 information in which the information indicating the posting status of the content, for which the posting status has been determined as being highly active, is associated with the content associated information of this content (for example, channel number), as posting status information.
(Step ST108)

Upon receiving the posting status information from the posting status notification server 4, the mobile terminal 1 performs a notification of the posting status from the output unit, based on this posting status information. For example, this mobile terminal 1 may, from the output unit, notify that the posting status of a content that has been determined as being highly active is ranked in one of top positions in the order of the content whose cumulative number of posts of posting information posted from the start time of the broadcasting is higher, and/or that it is ranked in one of top positions in the order of the content whose increase rate of the number of posts per unit time is higher. As a notification method of the mobile terminal 1, sound notification by means of a speaker provided in the mobile terminal 1, or light emission notification by means of LED may be used.

As a result, the user of the mobile terminal 1 can perceive the notification made by the output unit of the mobile terminal 1, and can recognize which one of the broadcasted contents has a highly active posting status (is in an active state).

Accordingly, when it is notified that there is a content that is more active than the content displayed on the mobile terminal 1 at the present point in time, the user may change the channel to the content with more active posting information upon the notification from the output unit as a cue.

Even when the power source of the mobile terminal 1 is in the OFF state, if posting status information is received from the posting status notification server 4, the mobile terminal 1 may perform a notification of the posting status from the output unit. As a result, even in the state where the mobile terminal 1 is not in use, it is possible to notify the user of a posting status and prompt the user to view and/or record the content.
(Step ST109)

When the user of the mobile terminal 1 wishes to change the content channel or view the content upon the notification of the output unit, he/she inputs an operation of requesting content distribution into the mobile terminal 1. The mobile terminal 1 then transmits a request command that requests the content distribution server 2 for distribution of the specified content. The user may specify a content of a distribution request based on the notification result, and the mobile terminal 1 may decide a content of a distribution request based on posting status information. For example, the mobile terminal 1 may notify a posting status based on posting status information, and may transmit a request command to request distribution of a content, the posting status of which is the most active. In this manner, without waiting for a user operation, it is possible to prevent a content with the most active posting information from being missed, by automatically requesting distribution of the highly active content.
(Step ST110)

The content distribution server 2 transmits data of the requested content to the mobile terminal 1.
(Step ST111)

The mobile terminal 1 receives the data of the requested content from the content distribution server 2.

As a result, the mobile terminal 1 can reproduce the content requested by the user, based on the distributed content data.

Figure 3:
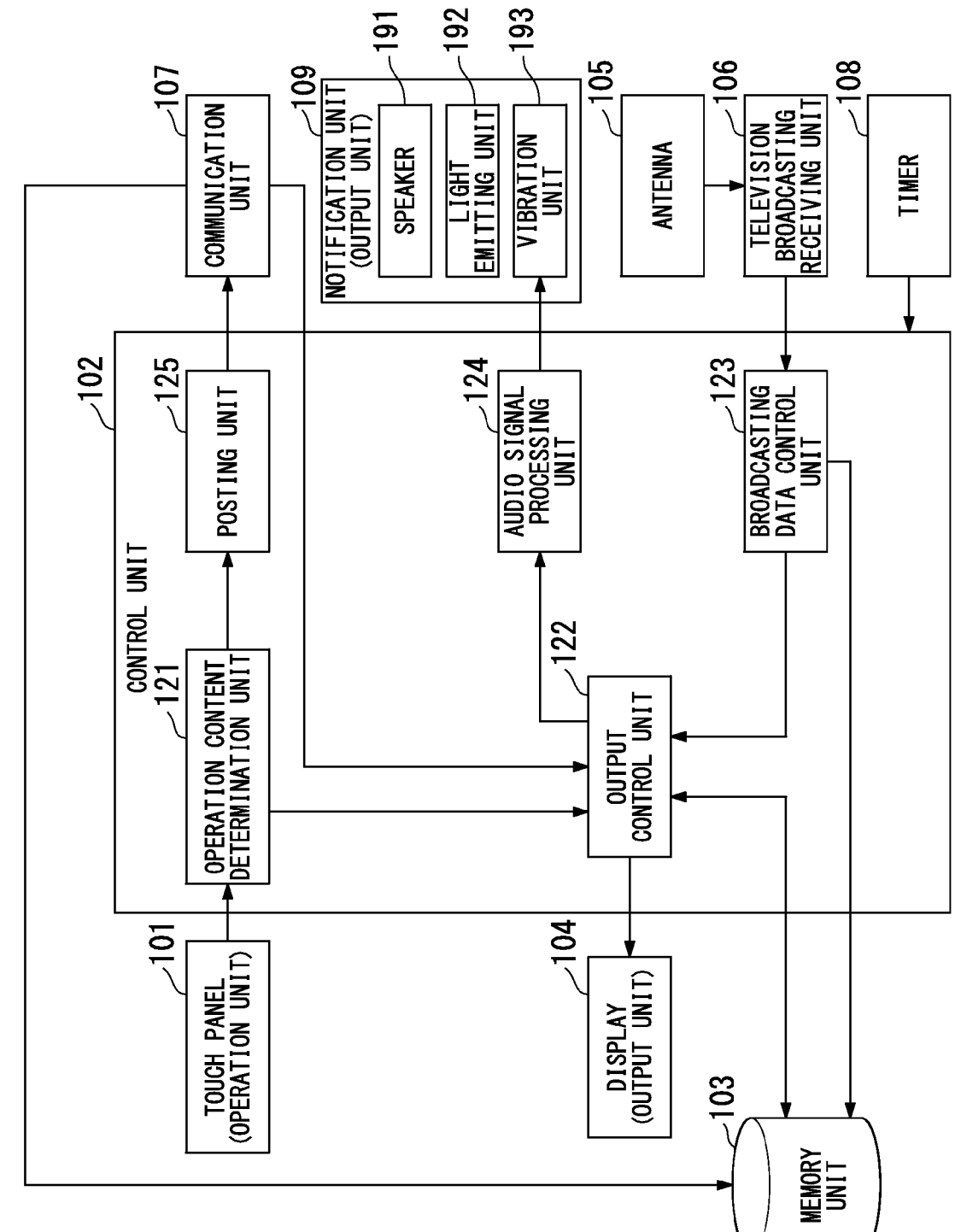
FIG. 3 is a block diagram showing an example of basic constituents of a mobile terminal according to the first exemplary embodiment of the present invention.

Next, basic constituents of the mobile terminal 1 are described, with reference to FIG. 3. FIG. 3 is a block diagram showing an example of basic constituents of the mobile terminal 1.

The mobile terminal 1 includes a touch panel (operation unit) 101, a control unit 102, a memory unit 103, a display (display unit) 104, an antenna 105, a television broadcasting receiving unit 106, a communication unit 107, a timer 108, and a notification unit 109. This notification unit 109 includes a speaker 191, a light emitting unit 192, and a vibration unit 193. In the present exemplary embodiment, the display 104 and the notification unit 109 are an example of the output unit that outputs a notification status.

The touch panel 101 includes a sensor that accepts user operations, and it outputs detection results of the sensor to the control unit 102. In the present exemplary embodiment, the touch panel 101 detects a contact position of user's finger coming into contact with the operation screen at given time intervals by means of the sensor, and outputs detection results of this sensor. The present exemplary embodiment is not limited to this example. For example, the touch panel 101 may detect the position of user's finger or an operation instruction means (stylus pen) in close proximity of the operation screen, by means of a non-contact sensor.

The control unit 102 is a CPU (central processing unit), and it reads various types of information stored in the memory unit 103. Further, it performs overall control of the mobile terminal 1, and includes function configuration units that function according to each process content. As each of the function configuration units, this control unit 102 includes an operation content determination unit 121, an output control unit 122, a broadcasting data control unit 123, an audio signal processing unit 124, and a posting unit 125.

The operation content determination unit 121 determines the content of the operation accepted on the touch panel 101, based on the output of the touch panel 101. For example, the operation content determination unit 121 may determine the movement of a user's finger, based on the contact position (or proximity position) of a user's finger indicated by the detection results of the touch panel 101 and the contact time (or proximity time). The operation content determination unit 121 may also determine the content of an operation indicated by the determined movement of a user's finger, based on the determined movement of a user's finger and the positional relationship with an image displayed on the display 104 at the time of accepting the operation.

For example, in the case where the touch panel 101 detects an operation of a user's finger coming in contact with or coming in close proximity of an icon portion or a text portion of the display screen, the operation content determination unit 121 may determine the operation as a touch operation. When the touch panel 101 detects an operation of a finger moving in the state where an icon portion or a predetermined operation region has been instructed by means of a touch operation, the operation content determination unit 121 may determine the operation as a slide operation.

The operation content determination unit 121 instructs the output control unit 122 to display on the display 104 the display content according to the operation content, based on the determination result.

Based on the operation content indicated by the determination result from the operation content determination unit 121 and/or the command input via the communication unit 107, the output control unit 122 executes a display control that causes the display 104 to perform displaying, and a notification control that causes the notification unit 109 to output sound and/or light, and/or the notification unit 109 to vibrate.

In the present exemplary embodiment, the output control unit 122 executes a content image display process for displaying a content on the display 104, and a posting screen display process for displaying on the display 104 an image for posting posting information on the web. The output control unit 122 is capable of switching between a simultaneous display mode and a single display mode, according to the setting specified by the user. When the simultaneous display mode is set, the output control unit 122 causes the display 104 to display a content and posting information arranged on a single screen. When the single display mode is set, the output control unit 122 causes the display 104 to display either the content or posting information on the entire screen. To describe specifically, when the user specifies either one of the simultaneous display mode and the single display mode, the output control unit 122 switches the screen to be displayed on the display 104 according to the specified mode.

In the case where the touch panel 101 accepts an operation input for outputting a recorded content, the output control unit 122 reads the specified content data from the memory unit 103. The output control unit 122 then performs a control to display an image based on the read content data on the display 104, or output sound based on the content data from the speaker 191.

Based on the posting status information input from the communication unit 107, the output control unit 122 decides the notification method to be performed by the notification unit 109. To describe specifically, the output control unit 122 makes reference to the memory unit 103, and decides the notification method according to the posting status, based on the posting status information. The notification method according to the posting status may be preliminarily decided, and may also set by the user of the mobile terminal 1. This notification method according to the posting status is registered in the memory unit 103.

The output control unit 122 causes the notification unit 109 and/or the display 104 to notify a posting status, according to the decided notification method.

For example, in the case where an input of posting status information is accepted via the communication unit 107, the output control unit 122 may cause the speaker 191 to output sound, may cause the light emitting unit 192 to illuminate or flash light of a predetermined color, or may cause the vibration unit 193 to vibrate with a predetermined vibration pattern. In the case where the posting status information of the accepted input, for example, indicates that the posting status of a content being broadcasted by a broadcasting station A is the most active, the output control unit 122 may display on the display 104 that the posting status of the content being broadcasted by the broadcasting station A is the most active. That is to say, when posting status information is received, the output control unit 122 may cause the notification unit 109 to execute a notification operation, or may cause the notification unit 109 to execute a notification operation according to the posting status.

When posting status information is received in the stand-by state, the content reproduction state, or the locked state of the mobile terminal 1, the output control unit 122 can notify the posting status.

The stand-by state includes the state operating in the power saving mode and the state of displaying the initial screen. The locked state includes the state where operations on the touch panel 101 of the mobile terminal 1 are restricted. In this locked state, operations other than the operation for releasing the locked state are restricted, so that incorrect operations due to false operations are prevented.

When posting status information is received, the output control unit 122 may display on the display 104 an operation button that accepts an instruction of reproduction of the content, the posting status of which has been determined as being highly active. When reproduction of the content, the posting status of which has been determined as being highly active, is instructed via the touch panel 101, the output control unit 122 reproduces the instructed content. For example, the output control unit 122 may transmit to the content distribution server 2 a request command for requesting the content data of the content, the reproduction of which has been instructed. The output control unit 122 may acquire and reproduce the content data of the content, the reproduction of which has been instructed, among broadcasting contents distributed by the content distribution server 2.

Even in the case where no input of the content reproduction operation instruction is made by the user, the output control unit 122 may automatically reproduce the content, the posting of which is the most active, if posting status information has been received. That is to say, when the posting status satisfies a notification condition, the output control unit 122 may reproduce the content, the posting status of which has been determined as satisfying the notification condition. Even in the case where the mobile terminal 1 is in the stand-by state, the sleep state, or the locked state, the output control unit 122 may automatically reproduce the content, the posting of which is the most active.

In the case where it is set to display received content on a real time basis (real time mode), the broadcasting data control unit 123 controls the output control unit 122 so that the display 104 displays content data based on the digitally modulated content data input from the television broadcasting receiving unit 106. In the case where it is set to store received content data in the memory unit 103 and subsequently display it (video recording mode), the broadcasting data control unit 123 stores the digitally modulated content data input from the television broadcasting receiving unit 106 in the memory unit 103.

Upon accepting an input of a received base band signal demodulated by the output control unit 122, the audio signal processing unit 124 outputs sound from the speaker 191 based on the received base band signal. When the output control unit 122 instructs an output of a notification sound or message, the audio signal processing unit 124 outputs the notification sound or message from the speaker 191.

The posting unit 125 posts posting information on the web. When instructed to post posting information that has been input via an input field displayed on the display 104, the posting unit 125 associates the input posting information with the poster ID (or terminal ID) and outputs it to the communication unit 107.

As a result, the communication unit 107 transmits to the posting information management server 3 the posting information associated with the poster ID (or terminal ID).

When posting information is posted, the posting unit 125 may generate content associated information relevant to the content being displayed on the display 104 and transmit the posting information that includes the generated content associated information to the posting information management server 3. This process is described in detail later.

The memory unit 103 stores various types of information used in processes of the mobile terminal 1. The memory unit 103 temporarily stores posting information that is being created. Moreover, the memory unit 103 stores posting information received from the posting information management server 3, and content data downloaded from the content distribution server 2. Furthermore, the memory unit 103 stores setting information that defines a notification method according to the posting status.

The memory unit 103 may be of a configuration that includes, for example, a portable memory (recording medium) that can be freely attached to and removed from the mobile terminal 1 such as an SD card and IC card. The memory unit 103 may be provided on a predetermined external server (not shown in the figure).

The display 104 displays an image according to the control of the control unit 102. In the present exemplary embodiment, the display 104 is provided integrally with the touch panel 101. The display 104 displays the operation screen when the touch panel 101 accepts an operation.

This display 104 displays the image of the reproduced content data and/or posting information. Moreover, the display 104 functions as an output unit for notifying the user of a notification content by displaying an image based on the input image data.

The display 104 may have several display regions divided within the same display device, and may be configured with an independent display device for each display region.

The antenna 105 receives radio waves of a frequency designated for television broadcasting, and outputs analog signals of the received radio waves to the television broadcasting receiving unit 106.

The television broadcasting receiving unit 106 constitutes a television function. The television broadcasting receiving unit receives via the antenna 105 content data of one-segment terrestrial digital television broadcasting for mobile terminals, and program information including information relevant to the content of content (content-accompanying information) and an electronic program table (EPG information). This television broadcasting receiving unit 106 includes an analog circuit unit that extracts broadcasting data of a preliminarily selected channel from television broadcasting data received by the television antenna 105, and a digital circuit unit that digital-modulates broadcasting data. This digital circuit unit, for example, may OFDM (orthogonal frequency division multiplexing) demodulate received broadcasting data, may separate and decode video, audio, and data (character data) from multiplexed broadcasting data, and/or may perform extraction of compressed data.

The communication unit 107 is connected to the wireless communication network 5 and the Internet 6 via a base station 5A and an exchange 5B. This communication unit 107 may receive posting information transmitted from the posting information management server 3 via the Internet 6 for example. To describe specifically, the communication unit 107 receives content data from the content distribution server 2. Moreover, the communication unit 107 transmits and/or receives posting information to and/or from the posting information management server 3.

The timer 108 clocks current date and time (date and time of day), and outputs the clocked date/time information.

The notification unit 109 notifies the user of notification content by means of various means. As mentioned above, this notification unit 109 may include, for example, a speaker 191, a light emitting unit 192, and a vibration unit 193.

The speaker 191 converts an accepted signal input from the audio signal processing unit 124 into an audio signal, and outputs it.

The light emitting unit 192 may include, for example, an LED, and illuminates or flashes in a specified color, according to control of the output control unit 122.

The vibration unit 193 vibrates with a specified vibration pattern according to control of the output control unit 122.

Figure 4:
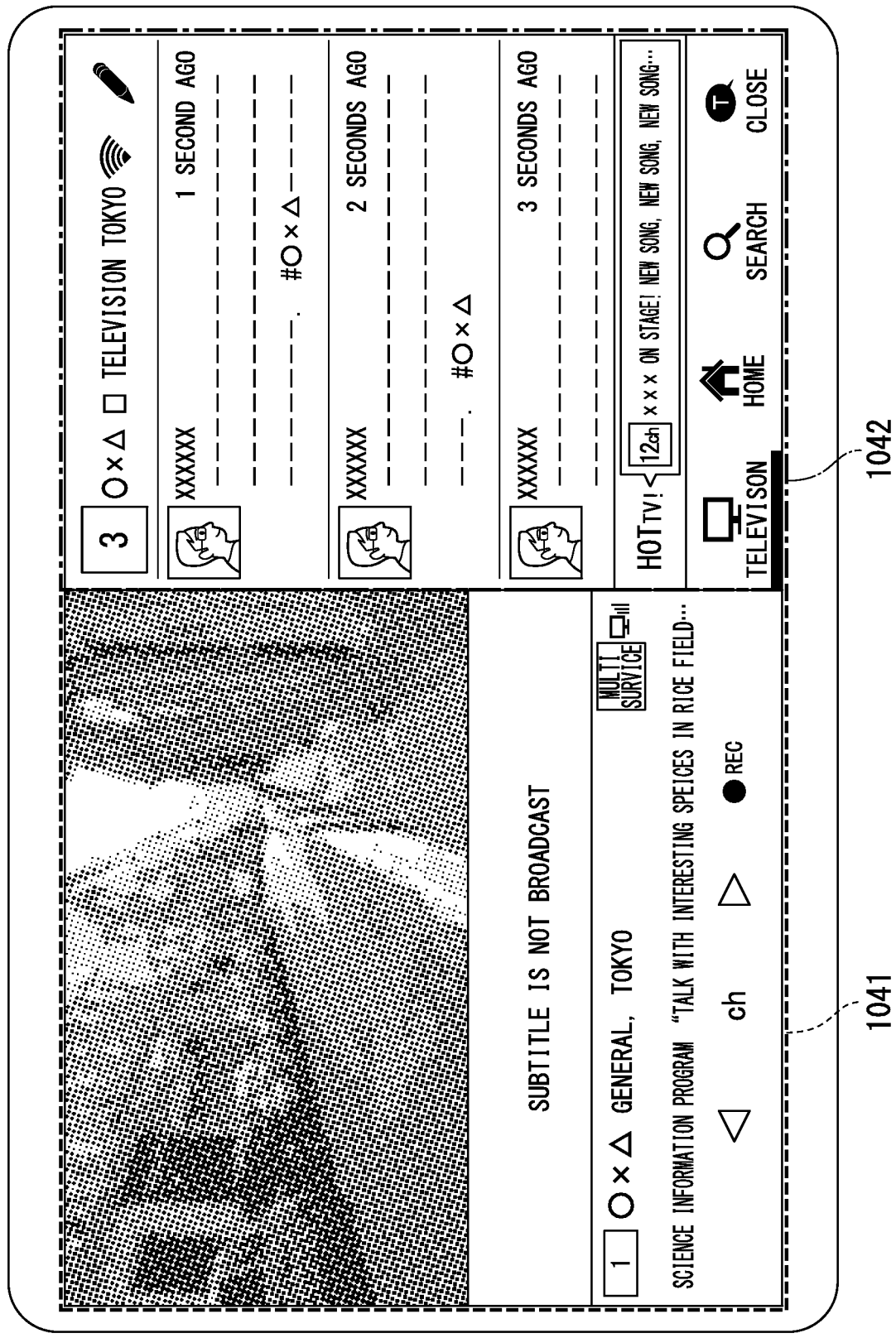
FIG. 4 is a diagram showing an example of a screen simultaneously displaying a content and posting information in the posting-status notification system according to the first exemplary embodiment of the present invention.

Next is described an example of a screen displayed on the display 104 of the touch panel 101, with reference to FIG. 4. FIG. 4 is a diagram showing an example of a screen simultaneously displaying a content and posting information. The screen shown in FIG. 4 is a screen that can be displayed when the output control unit 122 is in the simultaneous display mode.

As shown in FIG. 4, for example, in the mobile terminal 1, the entire screen of the display 104 is divided into two regions, and a content is displayed in one region while the other region displays posting information posted on the web. The area in which a content is displayed is referred to as content display region 1041. The area in which posting information is displayed is referred to as posting information display region 1042.

In the example shown in FIG. 4, the mobile terminal 1 displays a television program content received from the content distribution server 2 in the content display region 1041, and displays posting information relevant to this television program in the posting information display region 1042. In the present exemplary embodiment, a service content provided by Twitter (registered trademark) is displayed in the posting information display region 1042 of the display 104 shown in FIG. 4.

As shown in FIG. 4, several pieces of posting information are displayed in an arranged manner within the posting information display region 1042. These pieces of posting information are displayed in a manner of being arranged in chronological order according to posting time.

This posting information display region 1042 may display, for example, the program name and/or channel number of the content being displayed in the content display region 1041, and/or keywords in the pieces of posting information posted on the web that are drawing a high level of attention (hot words), and/or an operation button for searching for pieces of relevant posting information among several pieces of posting information. The posting information display region 1042 may display an operation button to be used when posting a piece of posting information, and/or hashtags that are relevant to the content being displayed in the content display region 1041.

Figure 5:
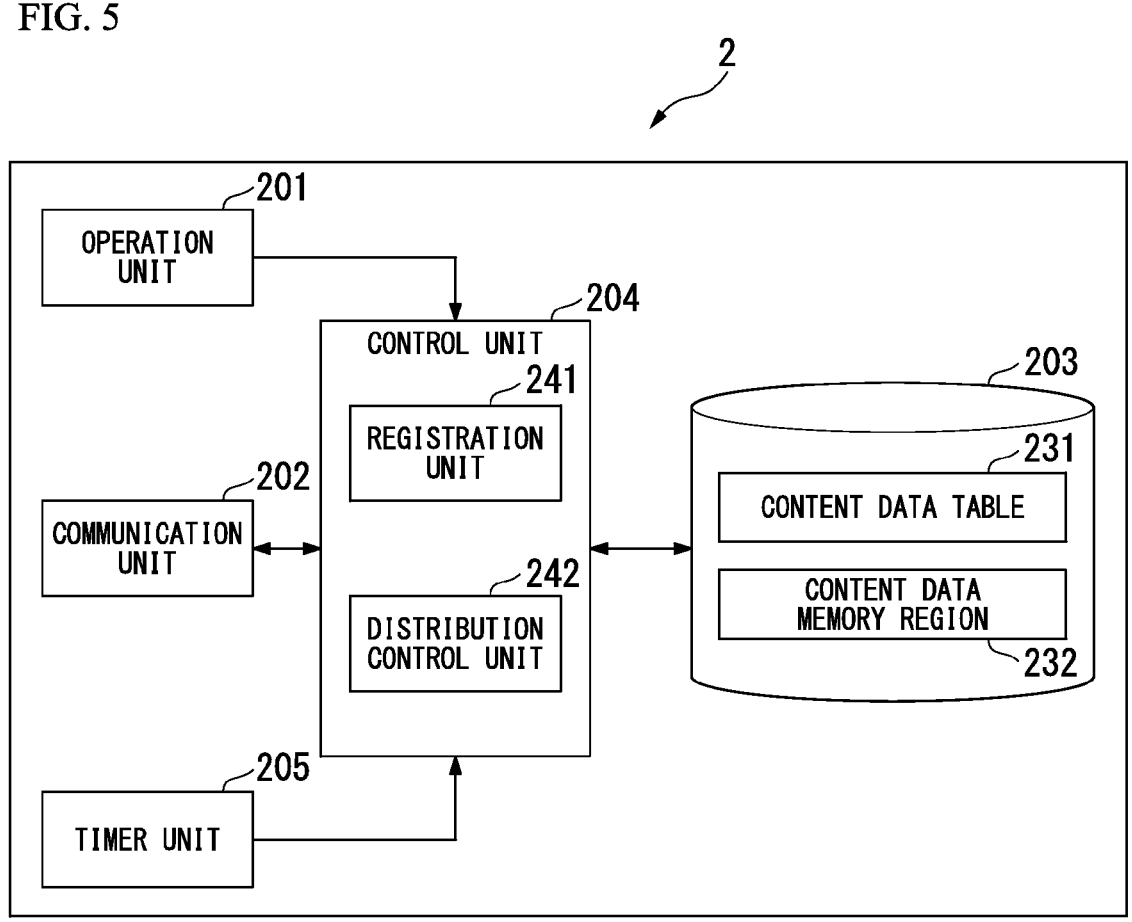
FIG. 5 is a diagram showing an example of a configuration of a content distribution server according to the first exemplary embodiment of the present invention.

Next, the content distribution server 2 is described, with reference to FIG. 5. FIG. 5 is a diagram showing an example of a configuration of the content distribution server 2.

As shown in FIG. 5, the content distribution server 2 includes an operation unit 201, a communication unit 202, a memory unit 203, a control unit 204, and a timer unit 205.

The operation unit 201 may, for example, accept an operation from the administrator of the content distribution server 2, and may output an operation signal that indicates the accepted operation.

The communication unit 202 transmits and/or receives information to and/or from the mobile terminal 1 via the Internet 6 and the wireless communication network 5.

The memory unit 203 stores each piece of information that has been associated in the content data table 231, and stores, in a content data memory region, content data to be distributed.

Next, an example of the content data table 231 is described, with reference to FIG. 6.

FIG. 6 is a diagram showing an example of the content data table 231.

The content data table 231 is a table that associates a content name, a content ID, a broadcasting time slot, a broadcasting station, a content data file name, and content-accompanying information with each other, and store them therein. A content name indicates the name of a content. A content ID indicates the identification number of the content. A broadcasting time slot indicates a time slot in which the content is to be broadcasted. A broadcasting station indicates a television broadcasting station that broadcasts the content. A content data file name indicates the file name of the content data. Content-accompanying information indicates the attribute of the content.

This content includes the video and audio of a television program to be digital broadcasted, and the audio to be distributed such as radio and music. In the present exemplary embodiment, hereunder, there is described an example of a case where the content is the video and audio of a television program to be digital broadcasted.

The content name may be, for example, the program name or the time of a drama series or a film to be broadcasted.

A broadcasting time slot is a time slot that is preliminarily decided as a time at which a content is to be broadcasted or distributed.

Content-accompanying information is a collective terminology for information that shows a content attribute and information that accompanies a content. When the content is video and audio of a television program, the content-accompanying information may include, for example, program name, broadcasting station name, performer's name, program category name, and other information relevant to the program content. This content-accompanying information may be information that is preliminarily decided by the broadcasting station that is broadcasting the television program or by the production agency, and may be decided by the administrator of the content distribution server 2.

Returning to FIG. 5, the description of each configuration of the content distribution server 2 is continued.

The control unit 204 is a CPU, and it reads various types of information stored in the memory unit 203. Further, it performs overall control of the content distribution server 2, and includes function configuration units that function according to each process content. As each of the function configuration units, this control unit 204 includes a registration unit 241 and a distribution control unit 242.

For example, upon receiving, from the communication unit 202, content data provided by the content distribution origin such as each television broadcasting station or production agency, the registration unit 241 registers the data in the content data memory region 232. In this case, the registration unit 241 associates information relevant to this content data (content name, content ID, broadcasting time slot, broadcasting station, content data file name, and content-accompanying information) and writes each piece of information into the content data table 231.

In the case, for example, where the content data table 231 is referenced and the current time has reached the starting point in time of the broadcasting time slot, the distribution control unit 242 reads the content data corresponding to this broadcasting time slot from the content data memory region 232, and broadcasts the data from the transmission antenna 8 via the communication unit 202.

Figures 7, 8:
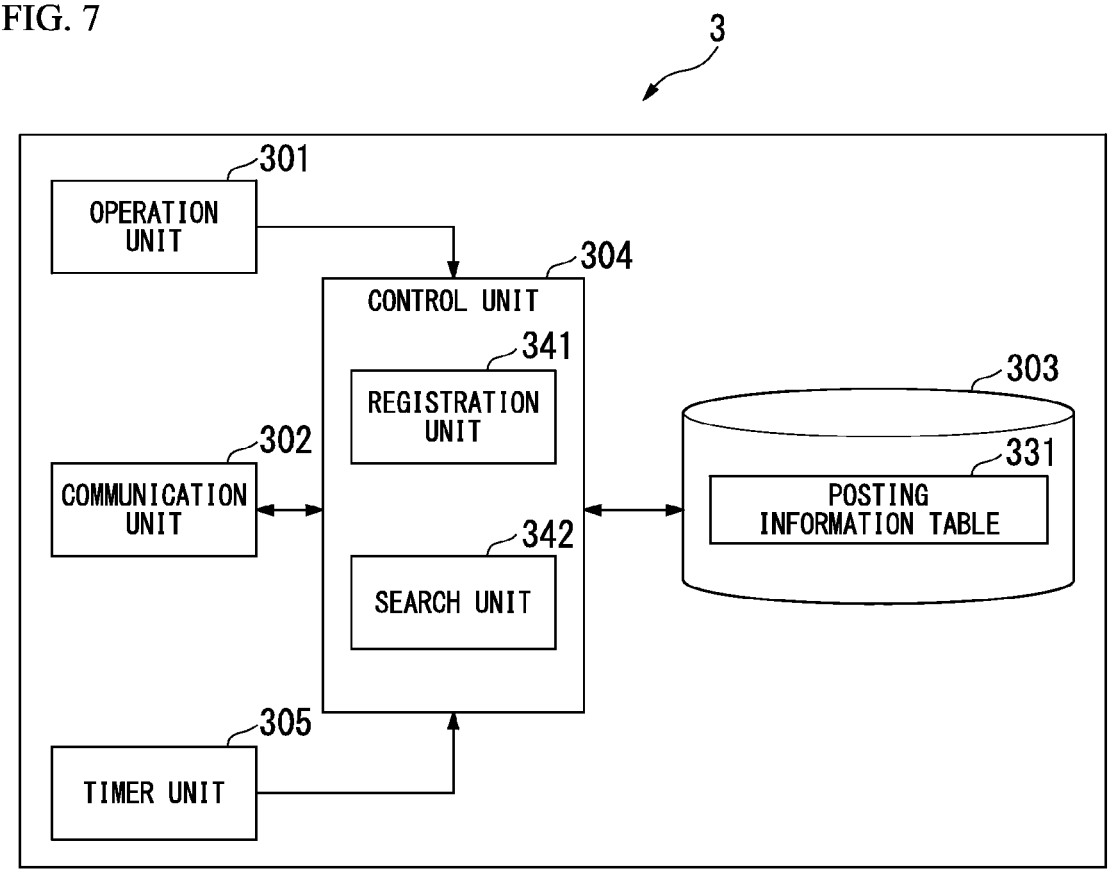
FIG. 7 is a diagram showing an example of a configuration of a posting information management server according to the first exemplary embodiment of the present invention.
FIG. 8 is a diagram showing an example of a posting information table according to the first exemplary embodiment of the present invention.

Next, the posting information management server 3 is described, with reference to FIG. 7. FIG. 7 is a diagram showing an example of a configuration of the posting information management server 3.

As shown in FIG. 7, the posting information management server 3 includes an operation unit 301, a communication unit 302, a memory unit 303, a control unit 304, and a timer unit 305.

The operation unit 301 accepts an operation from the administrator of the posting information management server 3, and outputs an operation signal that indicates the accepted operation.

The communication unit 302 transmits and/or receives information to and/or from the mobile terminal 1 and the posting status notification server 4 via the Internet 6 and the wireless communication network 5.

The memory unit 303 stores each piece of information that has been associated in the posting information table 331.

FIG. 8 is a diagram showing an example of the posting information table 331.

The posting information table 331 is a table that associates a poster ID, posting time information, posting information, and content associated information included in this posting information with each other, and that stores each of the pieces of information therein.

This poster ID may be a piece of information that identifies each poster, and may be, for example, a unique terminal ID assigned to the mobile terminal 1. The poster ID is not limited to this, and it may be a user ID registered on the posting web service where the poster has been registered. The poster ID may be a user ID for specifying each logged-in poster on the mobile terminal 1.

The posting time information is a piece of information that indicates a time or period at/during which posting information is posted. The posting time information may be a time that is timed by the timer unit 305 when the posting information is received in the communication unit 302. The posting time information may be a time that is timed on the mobile terminal 1 or the mobile terminal 7 when the posting information is transmitted from the mobile terminal 1 or the mobile terminal 7.

The posting information is a character sequence that indicates the content of the post posted by the poster.

The content associated information is a piece of information included in the posting information. The content associated information may also be, for example, a character sequence and/or a hashtag that indicates the television broadcasting station and/or the program name of the content, or a character sequence and/or a hashtag that indicates the content and/or performers of the content or a keyword that is relevant to the contents of the content. The content associated information may also be information that is extracted from posting information by the control unit 204. The content associated information may also be information that is included in posting information, or information that is associated with the broadcasting time slot or distribution time slot of the content and that is registered in the memory unit 303. This content associated information is a piece of information that is acquired by the control unit 304 based on posting information. The method of acquiring content associated information is described later.

Returning to FIG. 7, the description of each configuration of the posting information management server 3 is continued.

The control unit 304 is a CPU, and it reads various types of information stored in the memory unit 303. Further, it performs overall control of the posting information management server 3, and includes function configuration units that function according to each process content. As each of the function configuration units, this control unit 304 includes a registration unit 341 and a search unit 342.

When posting information is received from a mobile terminal 1 or a mobile terminal 7 via the communication unit 302, the registration unit 341 associates the received posting information with the poster ID, the posting time information, and the content associated information, and writes each piece of information into the posting information table 331.

For example, when posting information is received via the communication unit 302, this registration unit 341 acquires the time clocked by the timer unit 305 at the time of receiving this posting information, as posting time information.

The registration unit 341 acquires the poster ID that is transmitted together with the posting information. In the case where a terminal ID is received, the registration unit 341 may acquire the terminal ID as a poster ID, and may acquire, from the memory unit 303, the poster ID that is preliminarily associated with the terminal ID.

When posting information is received via the communication unit 302, the registration unit 341 acquires content associated information included in the posting information. In the case where a hashtag is included in the posting information for example, this registration unit 341 may acquire this hashtag as content associated information. In the case where posting information includes a program name, a broadcasting station name, performer's name and/or a preliminarily decided relevant word, the registration unit 341 may acquire these pieces of information as content associated information. This relevant word is a preliminarily decided keyword, and examples of this include a word that indicates a content category such as sports, comedy, drama, and film, or a word that indicates types of sports such as baseball, soccer, golf, volleyball, and table tennis. In the case where the posting information is associated with the channel number and/or content ID of the content that has been reproduced on the mobile terminal 1, the registration unit 341 may acquire the information associated with this posting information as content associated information. In the case where the information stored in the content data table 231 that is registered in the content distribution server 2 is registered in the memory unit 303, the registration unit 341 may acquire information indicating the broadcasting time slot of the content being reproduced on the mobile terminal 1 based, for example, on the posting time of the posting information, and may acquire the content name, content ID, broadcasting station, content-accompanying information corresponding to this broadcasting time slot, as content associated information.

Based on a request command that requests viewing of the posting information received from the mobile terminal 1, the search unit 342 searches for posting information corresponding to the received request command. To describe specifically, based on the hashtag included in the request command, the search unit 342 makes reference to the posting information table 331, and searches for the posting information associated with the content associated information that includes this hashtag. Then, the search unit 342 transmits this search result to the mobile terminal 1. A request command is a signal transmitted from the mobile terminal 1 to the posting information management server 3 when an operation for requesting viewing of posting information is input on the mobile terminal 1.

Figures 9, 10:
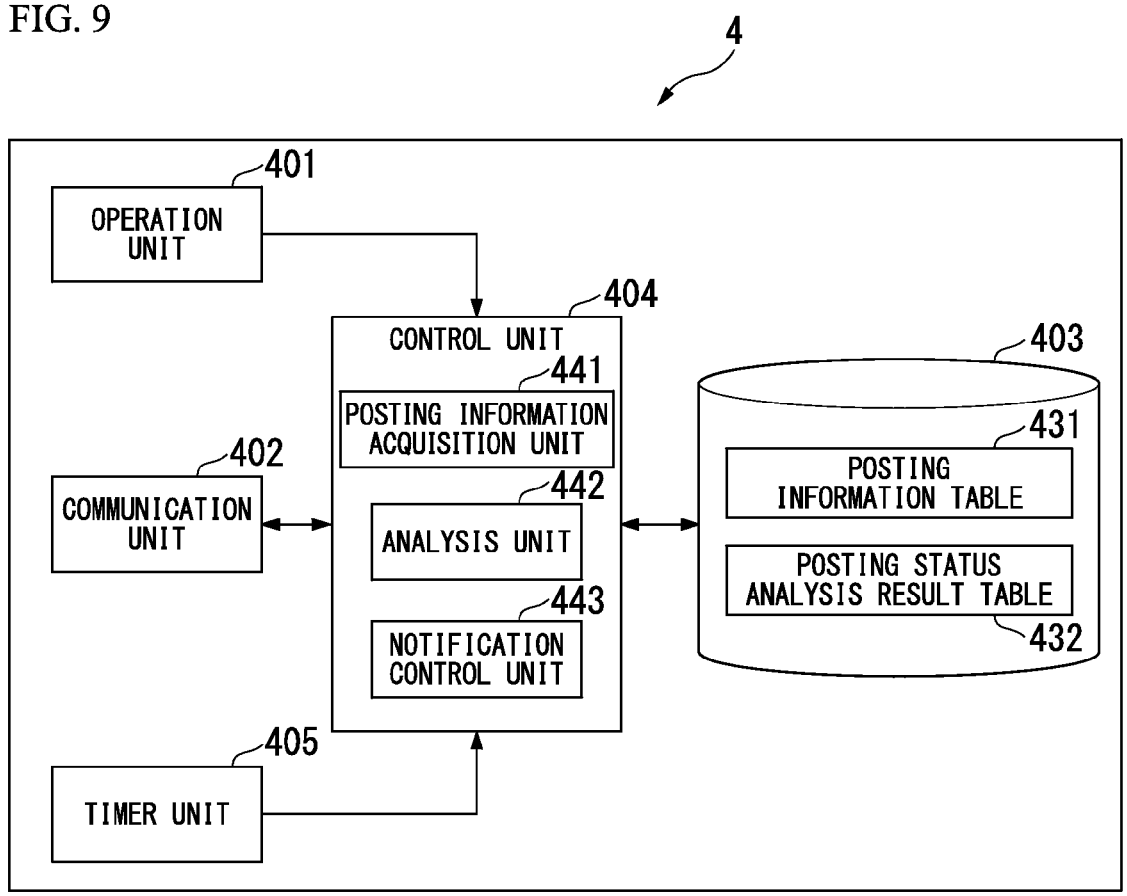
FIG. 9 is a diagram showing an example of a configuration of a posting status notification server according to the first exemplary embodiment of the present invention.
FIG. 10 is a diagram showing an example of a posting status analysis result table according to the first exemplary embodiment of the present invention.

Next, the posting status notification server 4 is described, with reference to FIG. 9. FIG. 9 is a diagram showing an example of a configuration of the posting status notification server 4.

As shown in FIG. 9, the posting status notification server 4 includes an operation unit 401, a communication unit 402, a memory unit 403, a control unit 404, and a timer unit 405.

The operation unit 401 accepts an operation from the administrator of the posting status notification server 4, and outputs an operation signal that indicates the accepted operation.

The communication unit 402 transmits and/or receives information to and/or from the mobile terminal 1, the mobile terminal 7, and the posting information management server 3 via the Internet 6 and the wireless communication network 5.

The memory unit 403 stores each piece of information associated in the posting information table 431 and the posting status analysis result table 432. This posting information table 431 may also be a table, for example, that stores the same information as that of the posting information table 331 provided in the posting information management server 3, and therefore, detailed description thereof is omitted.

FIG. 10 is a diagram showing an example of the posting status analysis result table 432.

The posting status analysis result table 432 is a table that associates a posting status, a content, and analysis time information with each other, and that stores each of the pieces of information therein.

A posting status is a piece of information that indicates a posting status, which is a result of an analysis performed by the control unit 404.

A content is a piece of information that indicates the content for which this posting status is analyzed.

Analysis time information is a piece of information that indicates a posting period of the posting information used in the analysis.

Returning to FIG. 9, the description of each configuration of the posting status notification server 4 is continued.

The control unit 404 is a CPU, and it reads various types of information stored in the memory unit 403. Further, it performs overall control of the posting status notification server 4, and includes function configuration units that function according to each process content. As each of the function configuration units, this control unit 404 includes a posting information acquisition unit 441, an analysis unit 442, and a notification control unit 443. The notification control unit is an example of a determination unit and an instruction unit.

The posting information acquisition unit 441 acquires posting information from the posting information management server 3. This posting information acquisition unit 441 may acquire, along with the posting information, a poster ID, posting time information, and content associated information associated with this posting information, from the posting information management server 3. The posting information acquisition unit 441 associates each piece of information acquired from the posting information management server 3, and writes each of the pieces of information into the posting information table 431 of the memory unit 403.

In the present exemplary embodiment, the posting information acquisition unit 441 periodically acquires posting information from the posting information management server 3. For example, the posting information acquisition unit 441, every time when a predetermined period of time has elapsed, may transmit to the posting information management server 3 a request command for requesting a transmission of updated posting information. This posting information acquisition unit 441, for example, may request a transmission of all of the posting information posted in the last ten minutes, among the posting information registered in the posting information management server 3. The posting information acquisition unit 441 may request, for each content, a transmission of the posting information that is associated with the predetermined content associated information, among the posting information posted within the last ten minutes. The posting information acquisition unit 441 may request a transmission of posting information posted from a specific poster, for each piece of attribute information of the poster.

The analysis unit 442 analyzes the posting status based on the posting information acquired by the posting information acquisition unit 441. This analysis unit 442 may, for example, perform analysis according to the notification condition referenced by the notification control unit 443.

In the present exemplary embodiment, for example, as a notification condition, first to third notification conditions, which are described below, may be preliminarily decided, and each notification condition may be preliminarily registered in the memory unit 403.

The first notification condition is a condition that indicates that a content is highly active, and it is such that the number of posts of posting information relevant to each content posted per unit time is not less than a predetermined threshold value.

The second notification condition is a condition that indicates that a content is highly active, and it is such that the rate of changes in the number of posts of posting information relevant to each content posted per unit time is not less than a predetermined threshold value.

The third notification condition is a condition that indicates that a content is highly active, and it is such that the cumulative number of posts of posting information relevant to a content posted between the broadcasting start time of each content (or the reproduction start point in time) and the current time (or the current point of reproduction) per unit time, is not less than a predetermined threshold value.

In the case where it is preliminarily decided that the notification control unit 443 makes reference to the first notification condition, the analysis unit 442 calculates the number of posts per unit time for each content. For example, the analysis unit 442 may count the number of pieces of posting information that are posted during a period between the current time and the moment a unit length of time before the current time (for example, ten minutes ago), among the posting information associated with the content associated information indicating the same channel number.

In the case where it is preliminarily decided that the notification control unit 443 makes reference to the second notification condition, the analysis unit 442 calculates the number of posts per unit time for each content, and calculates the change rate with respect to the number of posts per unit time, which has been previously calculated. For example, the analysis unit 442 may perform calculations as described below. That is to say, the analysis unit 442 counts the number of pieces of posting information that are posted during a period between the time (2:50) a predetermined unit length of time (for example, ten minutes) prior to the current time (3:00), and the moment the unit length of time has elapsed thereafter, among the posting information associated with the content associated information indicating the same channel number. Based on the number of posts that has been previously counted (that is, the number of pieces of posting information posted between 2:40 and 2:49) and the current number of post (that is, the number of pieces of posting information posted between 2:50 and 2:59), the analysis unit 442 calculates the change rate.

In the case where it is preliminarily decided that the notification control unit 443 makes reference to the third notification condition, the analysis unit 442 calculates, for each content, the cumulative number of pieces of posting information relevant to the content that are posted since the content broadcasting starting time. For example, among the posting information associated with the content associated information that indicates the same channel number, the analysis unit 442 may count the number of pieces of posting information that have been posted during a period between the broadcasting start time (2:00) and the current time (3:00).

The notification control unit 443 determines whether or not the posting status of the posting information associated with the content among the posting information posted on the web, satisfies the predetermined notification condition. When the posting status satisfies the notification condition, the notification control unit 443 causes the notification unit 109 of the mobile terminal 1 to output the posting status.

In the present exemplary embodiment, the notification control unit 443 determines whether or not this posting status satisfies the notification condition based on the posting status analyzed by the analysis unit 442.

For example, in the case where it is preliminarily decided that a first notification condition is referenced, the notification control unit 443 may determine whether or not the number of posts per unit time for each content calculated by the analysis unit 442 is not less than the predetermined threshold value. If the number of posts is not less than the threshold value, the notification control unit 443 determines the posting status as satisfying the first notification condition.

In the case where it is preliminarily decided that a second notification condition is referenced, the notification control unit 443 may determine whether or not the change rate for each content calculated by the analysis unit 442 is not less than the predetermined threshold value. If the change rate is not less than the threshold value, the notification control unit 443 determines the posting status as satisfying the second notification condition.

In the case where it is preliminarily decided that a third notification condition is referenced, the notification control unit 443 may determine whether or not the cumulative number of posts since the broadcasting start time for each content calculated by the analysis unit 442 is not less than the predetermined threshold value. If the total number of posts is not less than the threshold value, the notification control unit 443 determines the posting status as satisfying the third notification condition.

If the notification condition is satisfied, the notification control unit 443 generates posting status information that instructs to notify the posting status, and transmits it to the mobile terminal 1 via the communication unit 402. The notification control unit 443, as posting status information, may generate a command for notifying that the posting status is highly active. The notification control unit 443, as posting status information, may generate a command for notifying which one of the first to third notification conditions is at least satisfied by the posting status.

Figure 11:
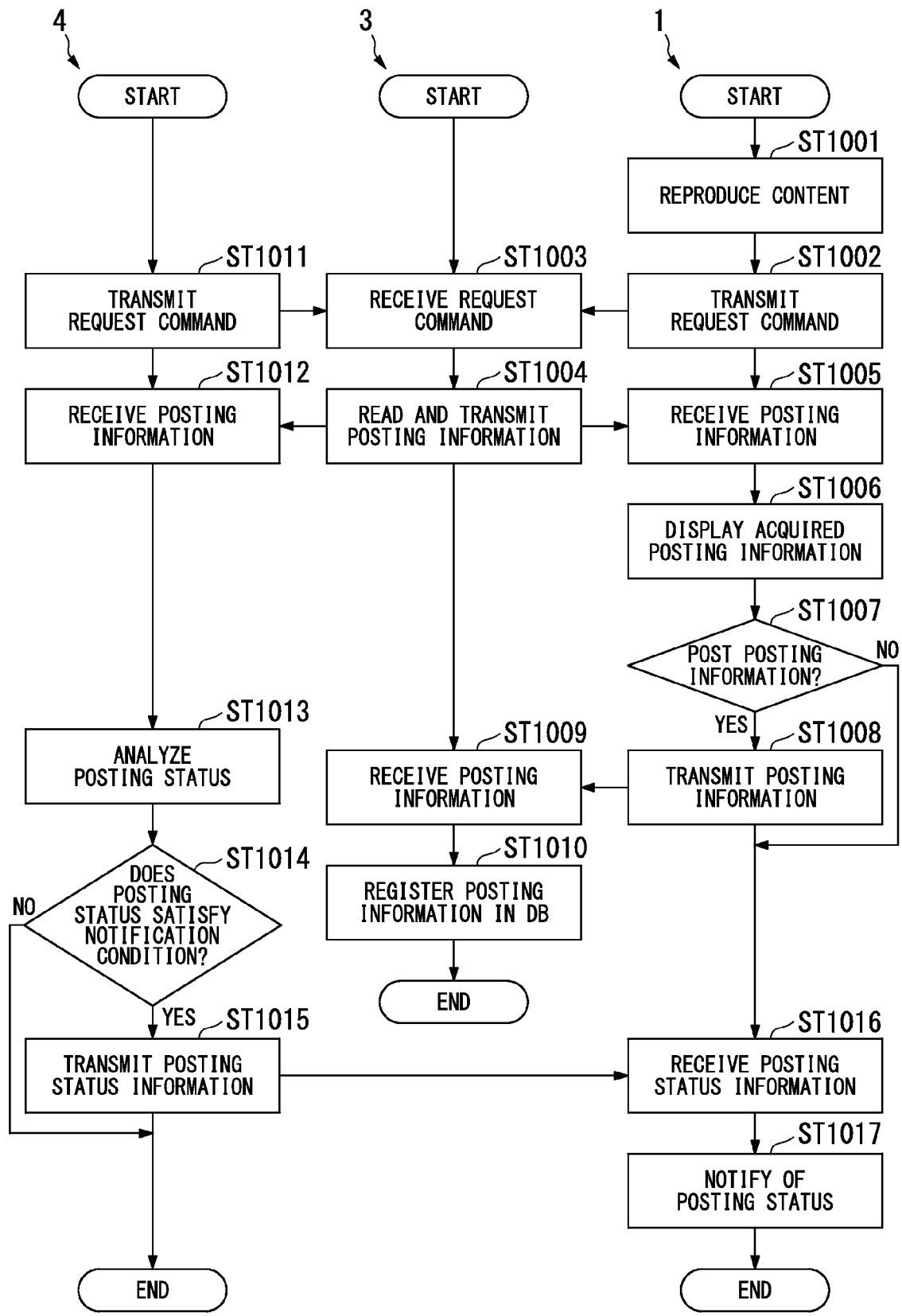
FIG. 11 is a flowchart showing an example of a posting-status notification method according to the first exemplary embodiment of the present invention.

Next is described an example of a process flow in the posting-status notification system 1 according to the present exemplary embodiment, with reference to FIG. 11. FIG. 11 is a flowchart showing an example of the posting-status notification method according to the present exemplary embodiment.

(Step ST1001)

For example, the distribution control unit 242 of the content distribution server 2 makes reference to the content data table 231 of the memory unit 203, and determines whether or not the current time clocked by the timer unit 205 has reached the start time of the content broadcasting time slot. If the current time has reached the start time of the content broadcasting time slot, or has reached the time a predetermined length of preparation time prior to the current time, the distribution control unit 242 reads the content data of the corresponding content from the content data memory region 232 of the memory unit 203, and outputs the data to the communication unit 202. The communication unit 202 transmits the analog signal of the accepted input content data to the transmission antenna 8. The transmission antenna 8 transmits radio waves multiplexed with the analog signal of the received content data.

For example, when reproduction of a content of a station A that is being broadcasted is instructed via the touch panel 101, the mobile terminal 1 may receive the content data of the specified content of the station A from the content distribution server 2 and reproduce the data.

To describe specifically, the antenna 105 of the mobile terminal 1 receives radio waves transmitted from the transmission antenna 8, and outputs the analog signal of the received radio waves to the television broadcasting receiving unit 106. The television broadcasting receiving unit 106 converts the received analog signal to a digital signal, and outputs the digital signal of the content data to the output control unit 122 via the broadcasting data control unit 123. The mobile terminal 1 may receive radio waves of the station A content data, and may also extract the station A content data from the received radio waves.

The mobile terminal 1 causes the display 104 to reproduce the content image based on the input of the station A content data. If the content includes audio, the output control unit 122 causes the speaker 191 to reproduce the audio of the content. As a result, the mobile terminal 1 can reproduce the content that is being broadcasted at present time by the station A.

Here is described a case where the simultaneous display mode is set on the mobile terminal 1. In this case, this mobile terminal 1 displays, in the content display region 1041 of the display 104, the image of the content being broadcasted at the present time by the station A.

(Step ST1002)

The output control unit 122 of the mobile terminal 1 transmits a request command that requests a transmission of posting information, to the posting information management server 3, via the communication unit 107. Here, the output control unit 122 requests a transmission of posting information that is relevant to the content being displayed on the display 104 in step ST1001. For example, the output control unit 122 may transmit, to the posting information management server 3 via the communication unit 107, a hashtag (#stationA) for identifying the content being displayed on the display 104, along with the request command. Moreover, the communication unit 107 associates the terminal ID (or poster ID) assigned to the mobile terminal 1 with the posting information, and transmits each piece of information to the posting information management server 3.

(Step ST1003)

The communication unit 302 of the posting information management server 3 receives the request command from the mobile terminal 1.

(Step ST1004)

Upon receiving the request command, the search unit 342 of the control unit 304 of the posting information management server 3 reads the requested posting information from the memory unit 303, and transmits the read posting information to the mobile terminal 1 via the communication unit 302. For example, the search unit 342 may make reference to the posting information table 331 of the memory unit 303, and may search for and read posting information associated with the hashtag (#stationA).

The communication unit 302 transmits all of the posting information obtained as a result of the search performed by the search unit 342 to the mobile terminal 1 indicated by the terminal ID (or poster ID) associated with the request command.

The exemplary embodiment of the present invention is not limited to this. The search unit 342 may search for other content associated information indicating the same content based on the hashtag (#stationA), and may acquire all of the posting information associated with those other content associated information obtained as a result of the search, as the posting information requested by the request command. For example, as the information indicating the same content, it is assumed that the hashtag (#stationA) and other information indicating the content (a hashtag such as #A and #soccer, a keyword such as station A, soccer, and A, the channel number of the station A, or the content ID) are associated with each other, and are preliminarily registered in the memory unit 303. In this case, by making reference to the posting information table 331, the search unit 342 can acquire all of the posting information associated respectively with content associated information that includes at least one of #stationA, soccer, and #soccer.

(Step ST1005)

The output control unit 122 of the control unit 102 of the mobile terminal 1 receives the posting information from the posting information management server 3 via the communication unit 107.

(Step ST1006)

The output control unit 122 causes the posting information display region 1042 of the display 104 to display the posting information received from the posting information management server 3.

As a result, as shown in FIG. 4, the content and the posting information are displayed simultaneously on the display 104.

As shown in FIG. 2, the mobile terminal 1 periodically transmits a request command and acquires posting information from the posting information management server 3, and displays the posting information in the posting information display region 1042.

(Step ST1007)

Based on the detection result of the touch panel 101, the mobile terminal 1 is in the state of being able to accept a posting instruction of the posting information input via the posting information display region 1042 of the display 104.

(Step ST1008)

When posting of the posting information is instructed, the posting unit 125 of the control unit 102 of the mobile terminal 1 transmits, to the posting information management server 3 via the communication unit 107, information having the terminal ID of the poster ID associated with the input posting information. In this case, the posting unit 125, for example, may transmit, to the posting information management server 3, the posting information that includes content associated information that indicates the content being displayed in the content display region 1041 of the display 104. In the present exemplary embodiment, the posting unit 125 transmits the posting information including the hashtag (#stationA) to the posting information management server 3.

(Step ST1009)

The registration unit 341 of the control unit 304 of the posting information management server 3 receives the posting information from the mobile terminal 1.

(Step ST1010)

Based on the information received from the mobile terminal 1, the registration unit 341 associates the terminal ID (or the poster ID) with the content associated information associated with the posting information, and writes it in the posting information table 331 of the memory unit 303. In the present exemplary embodiment, this registration unit 341 acquires the hashtag (#stationA) as content associated information from the posting information, and associates this hashtag (#stationA) with the posting information and writes it in the posting information table 331.

Moreover, the registration unit 341 associates the posting time information with the posting information and writes it in the posting information table 331. In the case where the posting time of the posted posting information is clocked by the mobile terminal 1 and it is granted, the registration unit 341 associates this posting time with the posting information as posting time information, and writes it in the posting information table 331. On the other hand, if the posting time is not granted to the posting information, the registration unit 341 associates the posting time, at which the posting information was received, with the posting information as posting time information, and writes it in the posting information table 331.

(Step ST1011)

The posting status notification server 4 periodically acquires posting information from the posting information management server 3. For example, the posting information acquisition unit 441 of the posting status notification server 4, every time when a predetermined period of time has elapsed, may transmit, to the posting information management server 3 via the communication unit 107, a request command for requesting a transmission of updated posting information.

(Step ST1003)

The search unit 342 of the control unit 304 of the posting information management server 3 receives the request command via the communication unit 302.

(Step ST1004)

Upon receiving the request command, the search unit 342 reads the requested posting information from the memory unit 303, and transmits the read posting information to the posting status notification server 4 via the communication unit 302.

(Step ST1012)

The posting information acquisition unit 441 of the control unit 404 of the posting status notification server 4 receives the posting information from the posting information management server 3 via the communication unit 402.

(Step ST1013)

The analysis unit 442 of the control unit 404 of the posting status notification server 4 analyzes the posting status based on the posting information acquired by the posting information acquisition unit 441. For example, the analysis unit 442 may analyze the posting status for each content that is currently broadcasted.

(Step ST1014)

The notification control unit 443 of the control unit 404 of the posting status notification server 4 determines whether or not this posting status satisfies the notification condition, based on the posting status analyzed by the analysis unit 442. For example, the notification control unit 443 may determine whether or not the posting status satisfies the notification condition, for each content that is currently broadcasted.

(Step ST1015)

If the posting status satisfies the notification condition, the notification control unit 443 generates posting status information that instructs to notify the posting status of this content, and transmits the posting status information to the mobile terminal 1 via the communication unit 402. As a specific example, here is described a case where the notification control unit 443 determines a content of a station B as satisfying the first notification condition. In this case, the notification control unit 443 generates posting status information that indicates that the posting status with respect to the content being currently broadcasted by the station B satisfies the first notification condition. Then, the communication unit 402 transmits the posting status information generated by the notification control unit 443 to the mobile terminal 1.

(Step ST1016)

The communication unit 107 of the mobile terminal 1 receives the posting status information from the posting status notification server 4, and outputs the posting status to the output control unit 122 of the control unit 102.

(Step ST1017)

Based on the posting status information input, the output control unit 122 determines the notification method to be performed by the notification unit 109. The output control unit 122 causes, depending on the notification method according to the posting status, the speaker 191 to output a predetermined sound, causes the light emitting unit 192 to illuminate or flash light of a predetermined color, or causes the vibration unit 193 to vibrate with a predetermined vibration pattern.

As a notification method of the posting status, there may be applied various types of methods. Based on the posting status information, the mobile terminal 1 may notify that there is at least a content with a posting status that should be notified, that is, there is a content for which posting is highly active. The mobile terminal 1 may identify the content, for which posting is highly active, and may notify the degree of this posting activeness in order to indicate how active the posting status is.

As a specific example, here is described a case where there is a program that is highly active other than the program being currently reproduced on the mobile terminal 1 (so-called a competing program in the same time slot on a different channel), among the programs that are currently being broadcasted. In this case, based on the posting status information, the mobile terminal 1 notifies that there is a competing program in the same time slot on a different channel. The mobile terminal 1 may, for example, sound an alarm sound, illuminate and/or flash a light, and/or vibrate. Moreover, the mobile terminal 1 may display on the display 104 the name and/or the channel number of the highly active program.

If the user wishes to change the channel to the competing program displayed on the display 104, the user brings their finger into contact with or close proximity of the display portion of the program name or channel number displayed on the display 104. The touch panel 101 detects the touch operation, and the control unit 102 accepts the operation of changing the channel to the competing program specified by the touch operation. The mobile terminal 1 then receives the content data of the specified program from the content distribution server 2, and causes the content display region 1041 of the display 104 to display the data.

As a result, the mobile terminal 1 can notify the user of the content, for which the posting status is highly active, in a simple manner, and can reproduce the highly active content based on the instruction of the user.

The user can always change the channel at arbitrary timing while the mobile terminal 1 is displaying the name or channel number of the highly active program on the display 104.

In the case where posting status information is received, the mobile terminal 1 may automatically reproduce the content, for which posting is highly active. As a result, the user can instantly view and browse the content for which posting is highly active.

As a specific example, here is described a case where another content that is different from the content, for which posting is highly active, is already being reproduced on the display 104. In this case, the output control unit 122 of the mobile terminal 1 receives, from the content distribution server 2, the content data of the content for which posting is the most active, based on the posting status information, and switches the content being displayed on the display 104 to the content for which posting is the most active.

If only posting information is being displayed on the display 104, the output control unit 122 of the mobile terminal 1 switches the display mode of the display 104 from the single display mode to the simultaneous display mode. Then, the output control unit 122 of the mobile terminal 1 receives, from the content distribution server 2, the content data of the content for which posting is the most active, based on the posting status information, and displays the data in the content display region 1041 of the display 104.

In the stand-by state or the locked state, the mobile terminal 1 may accept a reproduction instruction according to the posting status. In the stand-by state or the locked state, the mobile terminal 1 may automatically reproduce a content without a reproduction instruction of the content.

Figure 12A:
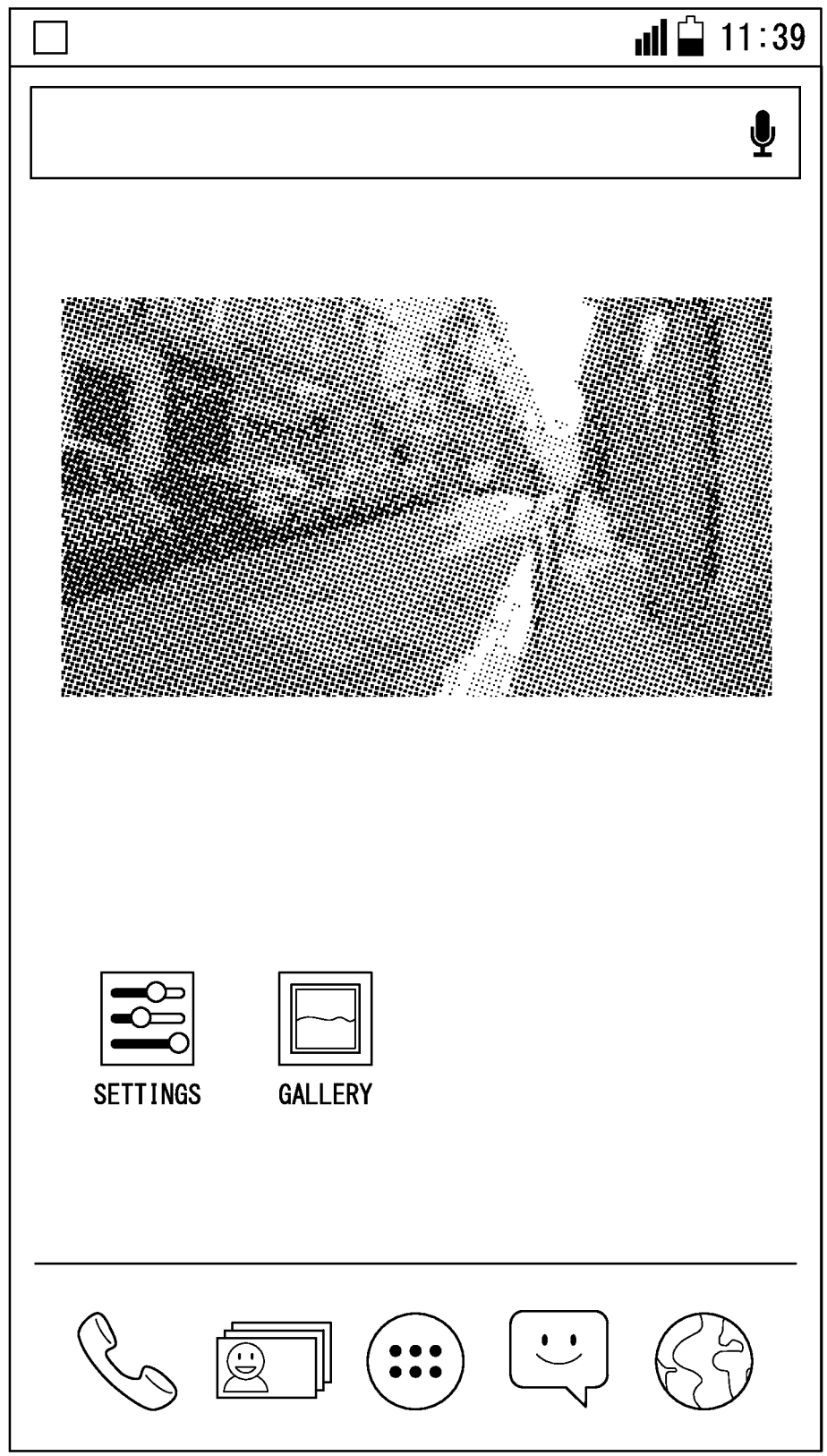
FIG. 12A is an explanatory diagram for describing an example of reproducing a content according to a posting status in the posting-status notification system according to the first exemplary embodiment of the present invention.
Figure 12B:
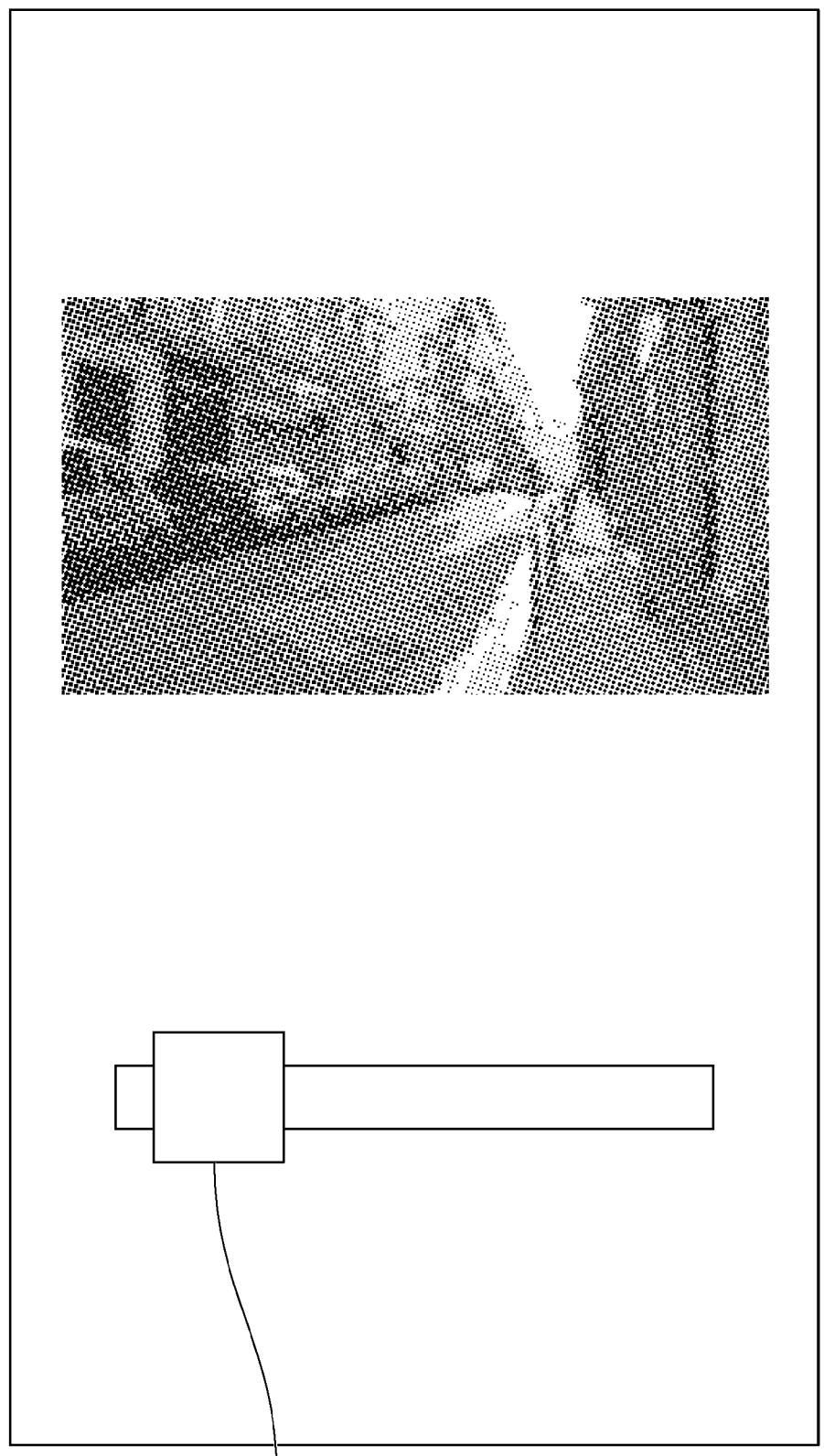
FIG. 12B is an explanatory diagram for describing an example of reproducing a content according to a posting status in the posting-status notification system according to the first exemplary embodiment of the present invention.

FIG. 12A and FIG. 12B are explanatory diagrams for describing an example of automatically reproducing a content according to a posting status, while the mobile terminal 1 is in the stand-by state or locked state.

FIG. 12A shows an example of reproducing a content according to a posting status, while the mobile terminal 1 is in the stand-by state. As shown in FIG. 12A, the mobile terminal 1 may display the content in part of the display 104 while it is in the stand-by state. Although it is not shown in the figure, the mobile terminal 1 may display the content on the entire screen of the display 104.

FIG. 12B shows an example of reproducing a content according to a posting status, while the mobile terminal 1 is in the locked state. As shown in FIG. 12B, the mobile terminal 1 may display the content in part of the display 104 while it is in the locked state. In this case, the mobile terminal 1 causes the display 104 to display the operation button 1043 that accepts a release operation for releasing the locked state.

As a result, it becomes possible to provide the user with an opportunity to instantly view a content, and it becomes possible to provide the user with an opportunity to view a viewing information content of a specific period, which is considered drawing a highest level of attention among the contents and considered as having a high level of importance. In other words, it becomes possible to enable the viewing state without losing the opportunity for viewing during a specific period.

The exemplary embodiment of the present invention is not limited to this. In the state where a posting status is output from the display 104 or the notification unit 109 in the locked state where operation input to the mobile terminal 1 is restricted, the operation content determination unit 121 of the control unit 102 of the mobile terminal 1 may release restriction at least on the operation that instructs reproduction of the content of the posting status.

With this configuration, even in the state where operation input is restricted, if a posting status is notified from the display 104 or the notification unit 109, the mobile terminal 1 can still accept the operation that instructs reproduction of the content of the posting status. Therefore, the user can, without performing the operation to release the locked state of the mobile terminal 1, view and browse the content by making an input of the operation that instructs reproduction of the notified content.

Moreover, the mobile terminal 1 maintains the locked state while the content is being reproduced. As a result, it is possible to prevent incorrect operations due to a false operation input while a content is being reproduced.

The exemplary embodiment of the present invention is not limited to this. In the state where a posting status is output from the display 104 or the notification unit 109 in the locked state where operation input to the mobile terminal 1 is restricted, the operation content determination unit 121 of the control unit 102 of the mobile terminal 1 may be configured in a manner described below. That is to say, at least when the restriction on the operation to instruct reproduction of the content of the posting status is released, the operation content determination unit 121 may accept instructions of lock release and content reproduction at the same time. In other words, in the case where a content reproduction instruction is accepted after having notified the posting status in the locked state, the mobile terminal 1 reproduces the instructed content and releases the locked state. In this manner, the level of operability is improved by treating the operation of content reproduction instruction and the operation of locked state release instruction as the same operation.

If the operation content determination unit 121 is not configured in the manner described above, it is necessary to perform the content reproduction instruction after the locked state has been released. Therefore, it is not possible to immediately shift to the content reproduction state from the locked state. Consequently, the level of operability is low and the timing of content reproduction becomes displaced. As a result, there is a possibility that the content may be temporarily missed in some cases.

In the display notification of posting information, the mobile terminal 1 can display, in the locked state, content associated information that is primarily text information of broadcasting content. This content associated information may be, for example, content relevant information that corresponds to the posting information posted with respect to the content that is determined as being the most active. In this case, if a contact instruction is performed, by means of a finger or an input device, on the content associated information displayed in a predetermined region that is defined on the touch panel 101, the mobile terminal 1 may release the locked state and may automatically display the target content based on the identification information included in the content associated information. As a result, the user that visually recognized the text information can reproduce the relevant content, and it is possible to simplify the process until viewing has been established.

As another configuration, it is possible to display a content that is being broadcasted as a video image or still image in a predetermined region on the unlocking screen displayed on the display 104 of the mobile terminal 1 being in the locked state. As a result, even if the mobile terminal 1 is in the state of being left still on a desktop, it is automatically brought to the state that enables content viewing as necessary. Accordingly, it is possible for the user to use the content service that will not let the user miss a scene that is drawing a high level of attention in the content.

When performing display notification, in order to enable immediate creation of posting information, if any operation is performed on the display notification, the operation may trigger shifting to the unlocked state without having to unlock the terminal to create an opportunity to create posting information.

Here is described a case where the mobile terminal 1 automatically reproduces a content that is highly active, according to the posting status. In this case, the mobile terminal 1 may start reproduction immediately after receiving posting status information. The mobile terminal 1 may start reproduction after a certain period of time has elapsed from the moment of receiving the posting status information.

As another method, the mobile terminal 1 may reproduce the content that is highly active, at the timing of a reproduction instruction being made by the user after receiving the posting status information. The mobile terminal 1 may preliminarily video record (audio record) the highly active content, and may reproduce the video recorded (audio recorded) content at the timing of a reproduction instruction being made by the user. As a result, in the case where the user is in a situation such as being engaged with something else where it is difficult for them to pay attention to content viewing, it is possible to displace the timing of reproduction start. Also there are some cases where the user may be on a train or inside a public facility and sudden content reproduction may be a nuisance for them. In this type of case, the user can decide on reproduction timing.

Accordingly, the content reproduction process is not limited to the process in which the content reproduction function is activated, and the real-time viewing is performed for reproducing the content data acquired from the content distribution server 2. If the user prefers on-demand viewing (that is to say, if the user prefers to avoid reproduction at the current location), the content reproduction process may be performed in a manner described below. That is to say, if the user chooses on-demand viewing, the control unit 102 of the mobile terminal 1 instructs the content distribution server 2 or the memory unit 103 of the mobile terminal 1 to accumulate broadcasting content. Then, the accumulated content data can be reproduced on demand. The user can arbitrarily select either one of the viewing modes of these types, namely the real time viewing and on-demand viewing.

In the case of the real time viewing, when the user activates the content reproduction function, the control unit 102 of the mobile terminal 1 may decide, for example, the most active content as a content to be reproduced, based on the acquired posting status information. In the state where the setting permits the mobile terminal 1 to automatically output audio, as a method of posting status notification, the control unit 102 may cause the speaker 191 to output only audio of the active content.

As a result, the user can more clearly perceive the content of the active broadcasting content by means of sound. Moreover, the control unit 102 of the mobile terminal 1 causes the speaker 191 to output only the audio of the content, and causes the display 104 to display the operation screen for specifying whether or not to start reproduction of the content image. In the case where an instruction of content image reproduction is accepted via the touch panel 101, the control unit 102 of the mobile terminal 1 causes the display 104 to display the image of the specified content.

In the case of the on-demand viewing, based on the acquired posting status, the mobile terminal 1 may, for example, transmit a command to instruct video recording of the most active content to the content distribution server 2. Based on the received command, the content distribution server 2 records, among the contents being broadcasted, the content that is specified for video recording. The content distribution server 2 distributes the recorded content to the mobile terminal 1.

As a result, the mobile terminal 1 enables viewing of the content that has already been distributed, at a desired time, without being limited to the time slot that is regulated by the content distribution relevant time table. In other words, even if it is a broadcasting content, the mobile terminal 1 can automatically reproduce a recorded content according to the posting status.

The destination of saved target contents that are automatically recorded according to the posting status is not limited to the content distribution server 2. The destination of saved target contents may be another server, and may be within the mobile terminal 1.

The recording capacity of the content distribution server 2 is greater than the memory capacity within the mobile terminal 1. Accordingly, in the case of recording contents on the content distribution server 2, there is an advantage in that recording capacity is less limited.

In the case of recording contents in the memory within the mobile terminal 1, there is an advantage in that reproduction contents can be reproduced on demand even when the communication environment deteriorates.

Figure 13A:
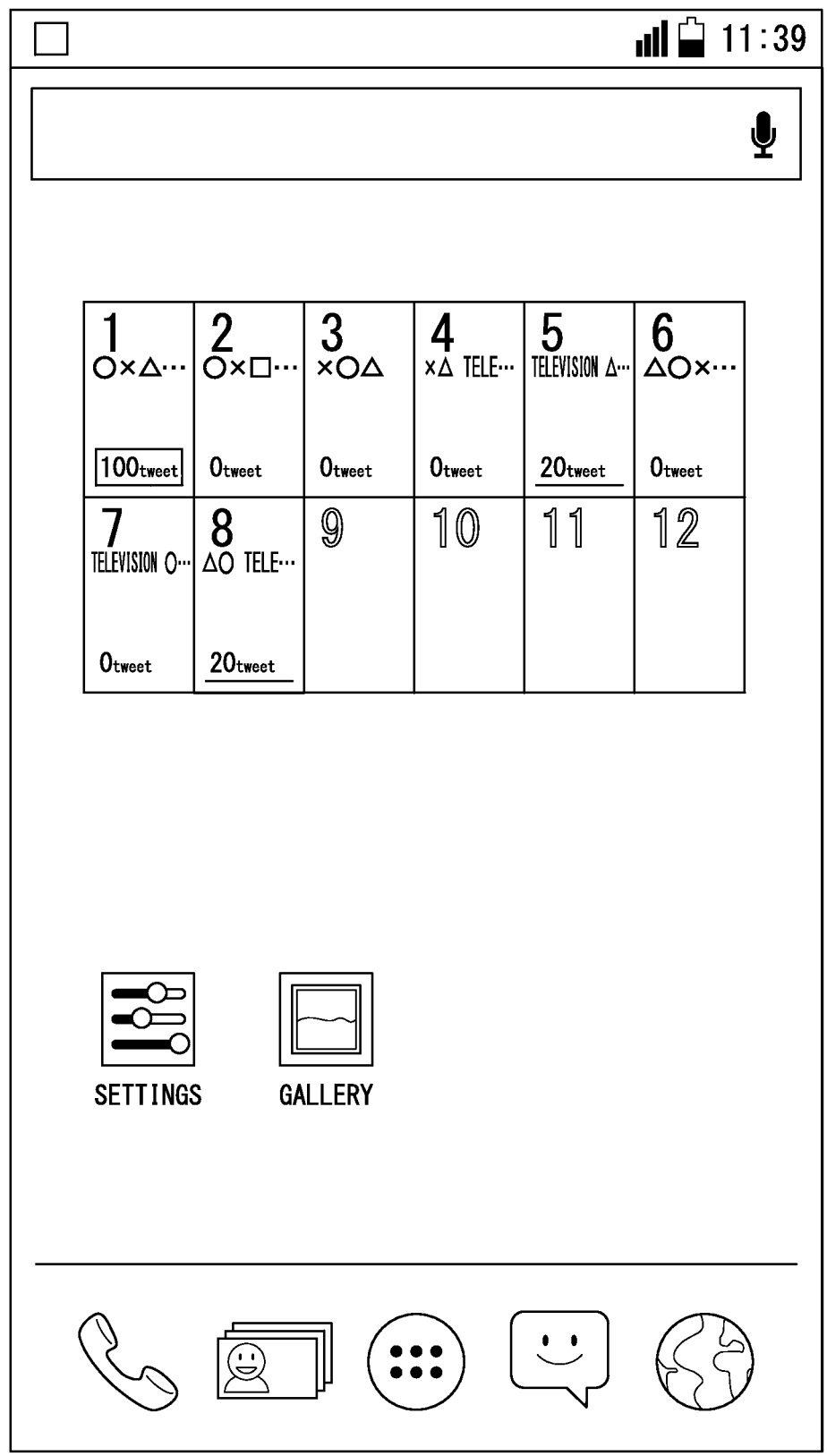
FIG. 13A is an explanatory diagram for describing an example of displaying a posting status in the posting-status notification system according to the first exemplary embodiment of the present invention.
Figure 13B:
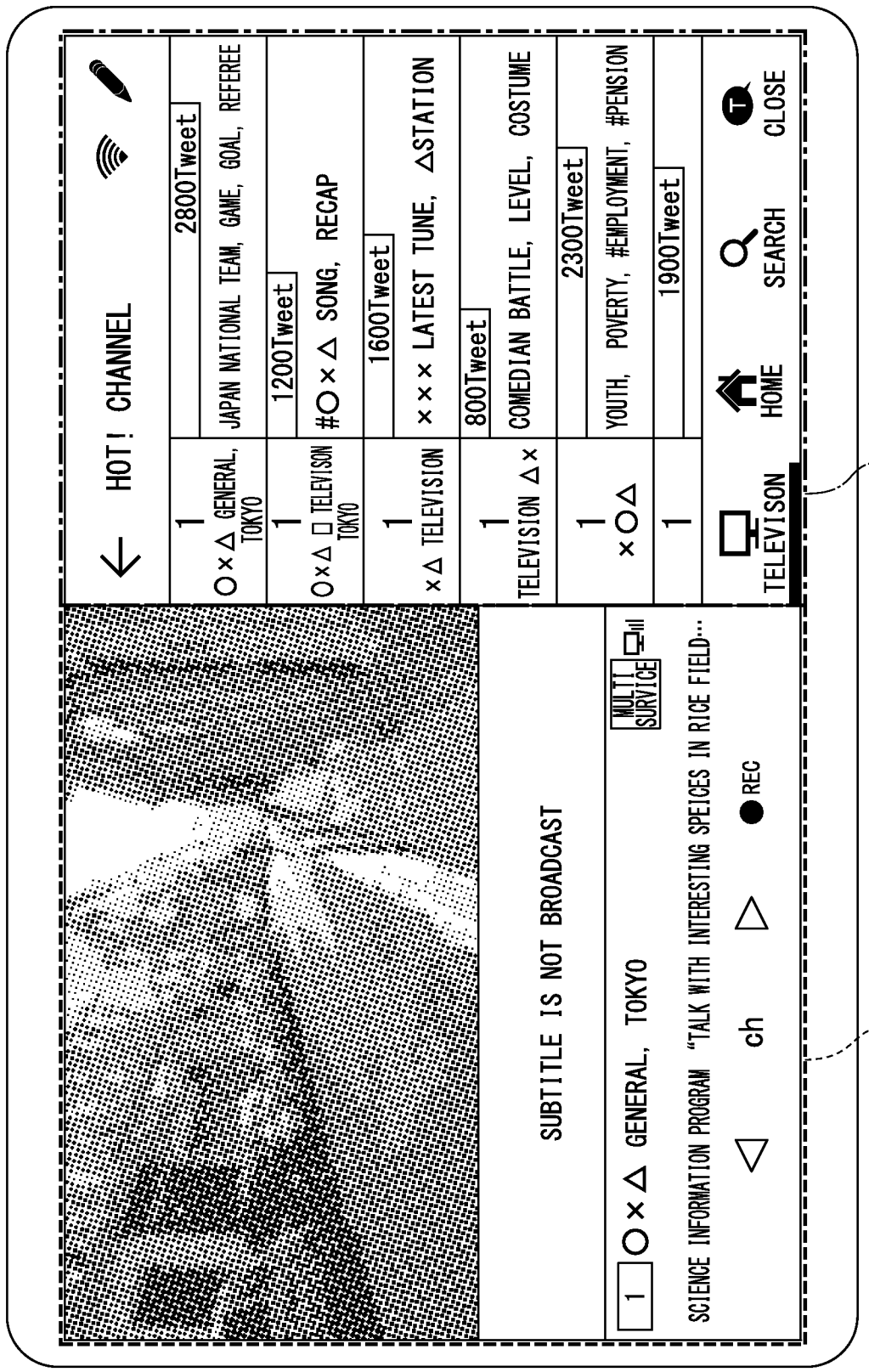
FIG. 13B is an explanatory diagram for describing an example of displaying a posting status in the posting-status notification system according to the first exemplary embodiment of the present invention.

In the stand-by state or the locked state, the mobile terminal 1 may display a posting status. FIG. 13A and FIG. 13B are explanatory diagrams for describing an example of displaying a posting status when the mobile terminal 1 is in the stand-by state or the locked state.

FIG. 13A shows an example of displaying a posting status when the mobile terminal 1 is in the stand-by state. As shown in FIG. 13A, the mobile terminal 1 may, on part of the display 104, display the posting status of each broadcasting content being currently broadcasted, in the stand-by state. Although it is not shown in the figure, the mobile terminal 1 may display the posting status on the entire screen of the display 104. In the locked state, the mobile terminal 1 may display the posting status on part of or the entire screen of the display 104.

As described above, the mobile terminal 1 can notify the posting status according to the set notification method. To realize the notification method, a setting value set by the user is preliminarily registered on the mobile terminal 1, and the mobile terminal 1 may execute notification according to this setting value.

As for the notification method, for example, the posting status analyzed by the posting status notification server 4 may be displayed for each of all contents that are currently being broadcasted, within a predetermined display region of the display 104 while the mobile terminal 1 is in the stand-by state or while a content that is available for distribution is being reproduced. This display example is shown in FIG. 13A. FIG. 13A is a diagram showing an example of displaying a posting status for each content that is being broadcasted.

As shown in FIG. 13A, for example, when contents of channels CH1 through CH8 are currently being broadcasted, the posting status of the content of each channel may be displayed as a symbol (bar) that indicates the number of posts of the posting information. To describe specifically, as posting status information, the mobile terminal 1 receives information that indicates the number of posts of posting information associated with each content from the posting status notification server 4. Based on the posting status information, the mobile terminal 1 displays, for example, a symbol (rectangular frame) that indicates the number of posts for CH1 being 100. The mobile terminal 1 displays a symbol (underline) that indicates the number of posts for CH5 being 20. The mobile terminal 1 displays a symbol (underline) that indicates the number of posts for CH8 being 20. The mobile terminal 1 displays a symbol (no symbol) that indicates the number of posts for CH2 through CH4, CH6, and CH7 being 0 respectively.

FIG. 13A shows an example of displaying a posting status of each content when the mobile terminal 1 is in the stand-by state.

FIG. 13B shows an example of displaying a posting status of each content in the posting information display region 1042 when the mobile terminal 1 is in the simultaneous display mode where a content and posting information are displayed simultaneously. When the image shown in FIG. 13B is displayed on the display 104, the mobile terminal 1 accepts a touch operation for instructing a channel number displayed in the posting information display region 1042. When a touch operation for instructing a channel number is detected, the mobile terminal 1 displays the content of the instructed channel number in the content display region 1041. When a touch operation for instructing display of the posting status that is displayed in the posting information display region 1042 is detected, the mobile terminal 1 displays the posting information of the instructed content in the posting information display region 1042.

As posting information relevant to each broadcasting content, the mobile terminal 1 may acquire content associated information with higher appearance frequency and may display the information in the posting information display region 1042. As a result, it is possible to easily notify the user as to what types of posting information are being posted for each broadcasting content.

As display of the content posting status of each channel, the mobile terminal 1 may display a symbol (bar) that indicates the number of posting information posts shown in FIG. 13A, in the posting information display region 1042.

The mobile terminal 1 may indicate an evaluation of the content posting status of each channel using the number of stars. To describe specifically, the mobile terminal 1 may display zero stars on the display 104 as an evaluation if the notification condition is not satisfied. The mobile terminal 1 may display one star on the display 104 as an evaluation if the notification condition is satisfied. The mobile terminal 1 may display one star on the display 104 if one notification condition of the first through third notification conditions is satisfied. The mobile terminal 1 may display two stars on the display 104 if two notification conditions of the first through third notification conditions are satisfied. The mobile terminal 1 may display three stars on the display 104 if all of the first through third notification conditions are satisfied.

In this manner, the mobile terminal 1 notifies the posting status of a specific content even in the state where a content that is currently available for distribution is being reproduced or where there is no chance for using any function in particular. As a result, it is possible to provide the user with a cue for starting reproduction of a specific content.

The speaker 191 of the mobile terminal 1 may reproduce a posting status in audio. The light emitting unit 192 of the mobile terminal 1 may illuminate or flash a light indicating a posting status.

As a result, even in the state where the mobile terminal 1 is not being operated, for example, in the stand-by state or the locked state, it is possible to provide the user with a cue for starting reproduction of a specific content, by means of audio notification performed by the speaker 191 and/or notification performed by the light emitting unit 192.

Even when the power source of the mobile terminal 1 is in the OFF state, if posting status information is received from the posting status notification server 4, the mobile terminal 1 can perform a notification of the posting status from the notification unit. To describe specifically, even when the power source is in the OFF state, that is, even in the locked state, the control unit 102 of the mobile terminal 1 can receive posting status information from the posting status notification server 4. The mobile terminal 1 still displays posting status even when the power source is in the OFF state, if posting status information is received from the posting status notification server 4. At this time, the mobile terminal 1 may display the posting status and may bring the power source of the mobile terminal 1 into the ON state. As a result, even in the state where the mobile terminal 1 is not in use, it is possible to notify the user of a posting status and prompt the user to view and/or record the content.

In this manner, in the case where a posting status is determined as being highly active, the mobile terminal 1 can notify the user of the posting status by means of image, sound, light, and/or vibration. Based on the posting status information, for example, this mobile terminal 1 can, while the program on the station A is being reproduced, notify the user of the posting status of the program on the station B, that is highly active. With this notification, the user can view and browse the program on the station B, and as a result, it is possible to ensure the opportunity to view/browse the highly active program on the station B. As a result, it is possible to prevent the competing program that is highly active from being missed.

In the case of the conventional system, even if posting is highly active for a content that is being broadcasted, the user is still unable to find a content for which posting is highly active without browsing the posting status. Moreover, for contents that are being broadcasted, there is a problem in that the load on the user for monitoring will increase if the user searches for a content, for which posting is highly active, and browses a content at the same time. Furthermore, if the user fails to find a content, for which posting is highly active, the user may miss this content in some cases.

In contrast, the posting-status notification system 100 according to the exemplary embodiment of the present invention can solve these problems by causing the mobile terminal 1 to notify of a posting status when the posting status satisfies a notification condition.

According to the present exemplary embodiment, even in the state where posting information is not displayed on the display 104, the mobile terminal 1 can notify the user of the posting status of a highly active content. Accordingly, even in the state of not browsing posting information, the user can recognize or can obtain a cue for recognizing what types of contents are drawing attention of people that are posting posting information, and/or how much of posting is being made for the contents by those who are viewing (browsing) the contents.

According to the present exemplary embodiment, the mobile terminal 1 can notify of a posting status that is determined based on several notification conditions. As a result, the mobile terminal 1 can notify the user of a posting status in which the manner of attentions being drawn or the pattern of activeness movement, such as the content that is currently drawing the highest level of attention (highly active), and the content for which the level of attention is rapidly increasing (highly active), are analyzed from different viewpoints.

According to the present exemplary embodiment, in the case where the posting status notification server 4 determines a posting status as satisfying the notification condition, the mobile terminal 1 can reproduce the content for which the posting status has been determined as satisfying the notification condition, can display the content image on the display 104, and can output audio of the content from the speaker 191. As a result, the user can ensure an opportunity for viewing (browsing) a content, the posting status of which is highly active, and it is possible to prevent the content from being missed. Therefore, the mobile terminal 1 can provide the user with a recommended content and the reproduction timing thereof.

According to the present exemplary embodiment, in the state (locked state) where operation input is restricted, if a posting status is notified from the notification unit 109, the mobile terminal 1 can release the restriction on the operation for instructing reproduction of the content of the posting status. Therefore, the user can, without performing the operation to release the locked state of the mobile terminal 1, view (browse) the content by making an input of the operation that instructs reproduction of the notified content. Furthermore, since the mobile terminal 1 maintains being in the locked state while the content is being reproduced, it is also possible to prevent incorrect operations due to a false operation input while the content is being reproduced.

Figure 14:
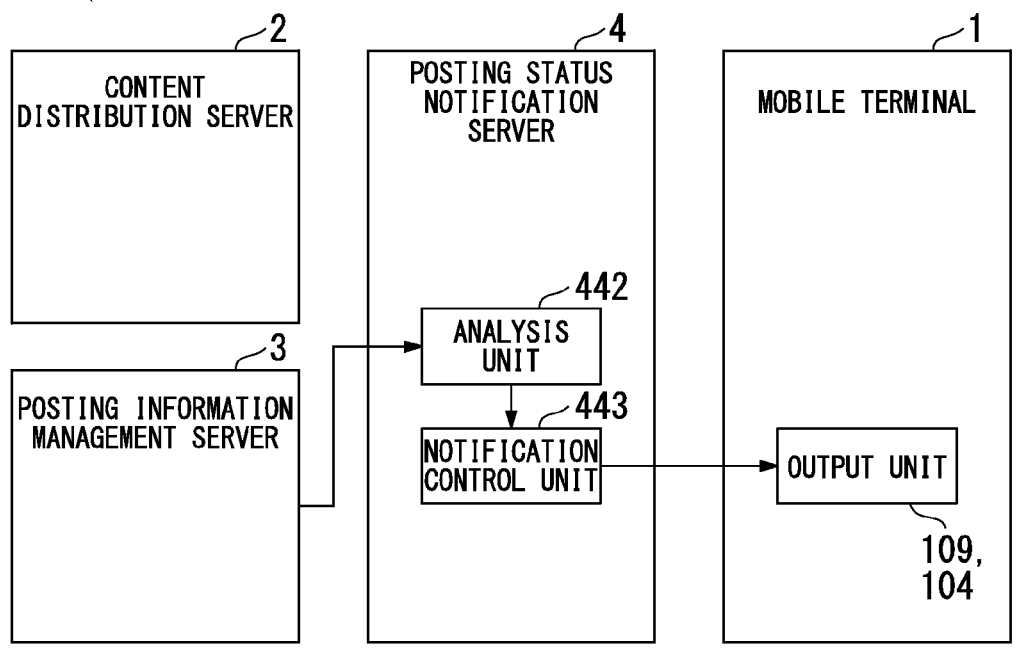
FIG. 14 is a diagram showing an example of a configuration overview of the posting-status notification system according to the first exemplary embodiment of the present invention.

Next is described a configuration overview of the posting-status notification system 100 according to the present exemplary embodiment, with reference to FIG. 14. FIG. 14 is a diagram showing an example of the configuration overview of the posting-status notification system 100 according to the present exemplary embodiment.

As shown in FIG. 14, the posting-status notification system 100 includes a posting status notification server 4 and a mobile terminal 1. The posting status notification server 4 includes an analysis unit 442 and a notification control unit 443. The mobile terminal 1 includes a notification unit 109 (including a display 104). In this manner, as a result of the posting status notification server 4 including the analysis unit 442 and the notification control unit 443, it is possible, for example, to batch-analyze the posting status of contents that are currently being broadcasted, and distribute the analysis result to several terminals. As a result, it is possible to improve the level of efficiency in the analysis process.

[Second Exemplary Embodiment]

Figure 15:
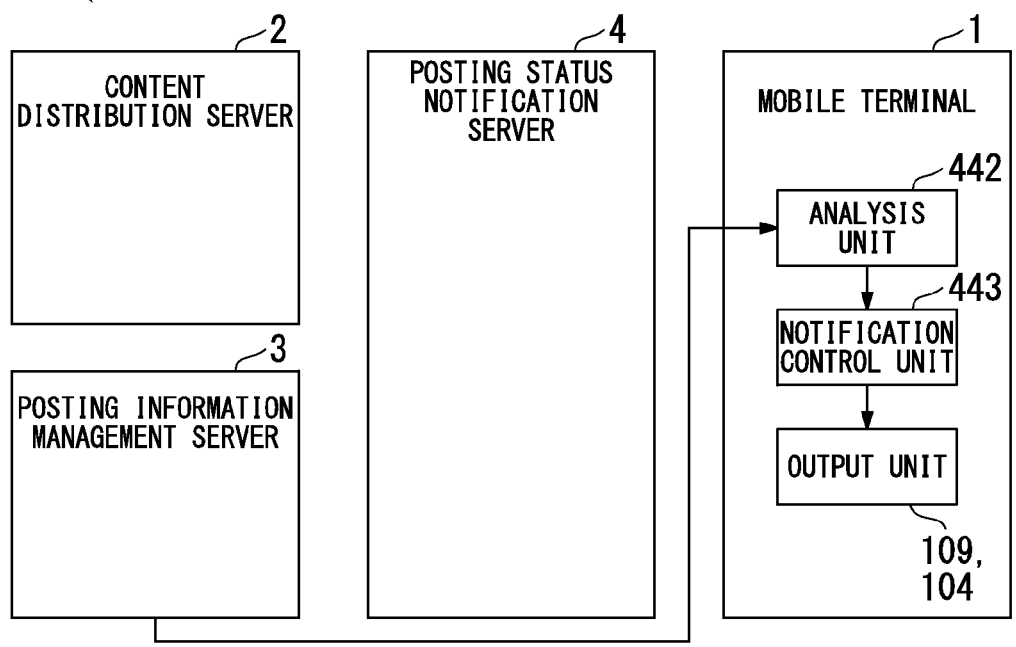
FIG. 15 is a diagram showing an example of a configuration overview of a posting-status notification system according to a second exemplary embodiment of the present invention.

A posting-status notification system according to an exemplary embodiment of the present invention is not limited to the positing-status notification system 100 of the first exemplary embodiment described above, and it may be a posting-status notification system 200 shown in FIG. 15.

Here is described a configuration overview of a posting-status notification system 200 according to a second exemplary embodiment, with reference to FIG. 15. FIG. 15 is a diagram showing an example of the configuration overview of the posting-status notification system 200 according to the second exemplary embodiment. In the posting-status notification system 200 shown in FIG. 15, configurations similar to those of the posting-status notification system 100 shown in FIG. 14 are given the same reference symbols, and detailed description thereof are omitted.

As shown in FIG. 15, in the posting-status notification system 200 according to the second exemplary embodiment, the mobile terminal 1 may include an analysis unit 442, a notification control unit 443, and a notification unit 109 (including a display 104). In this manner, by means of the mobile terminal 1 including the analysis unit 442 and the notification control unit 443, there is no need for providing a posting status notification server 4. Moreover, posting status can be analyzed on the mobile terminal 1, and therefore, it is possible to notify the user of posting status at a speed of nearly real time.

[Third Exemplary Embodiment]

Figure 16:
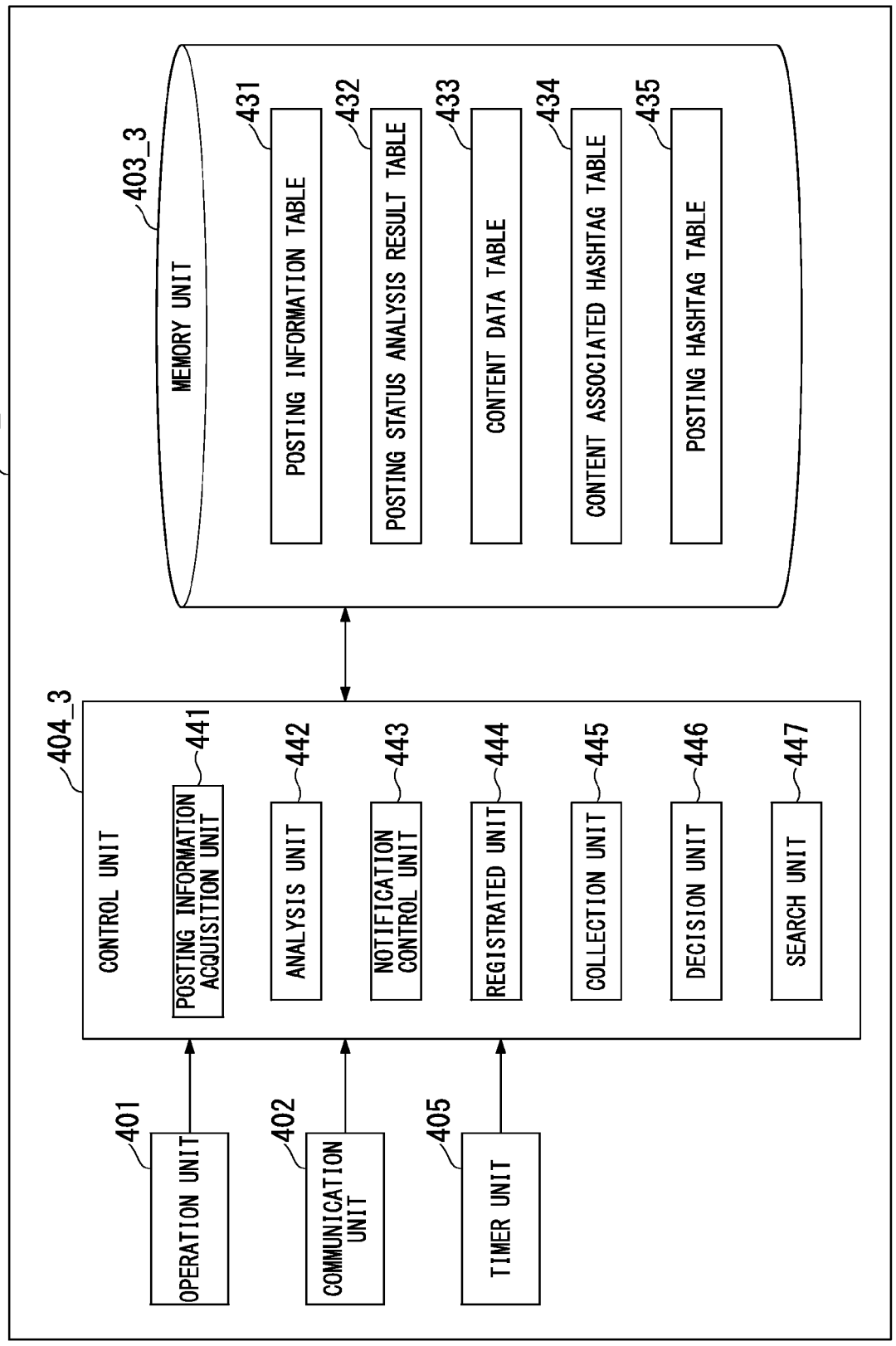
FIG. 16 is a diagram showing an example of a configuration overview of a posting status notification server according to a third exemplary embodiment of the present invention.

Hereunder, a third exemplary embodiment of the present invention is described, with reference to the drawings. FIG. 16 is a diagram showing a brief overview of a posting status notification server 4_3 according to the third exemplary embodiment of the present invention. In the posting status notification server 4_3 shown in FIG. 16, configurations similar to those of the posting status notification server 4 of the first exemplary embodiment are given the same reference symbols, and detailed description thereof are omitted.

Next, the posting status notification server 4_3 is described, with reference to FIG. 16. FIG. 16 is a diagram showing an example of a configuration of the posting status notification server 4_3.

As shown in FIG. 16, the posting status notification server 4_3 includes an operation unit 401, a communication unit 402, a memory unit 403_3, a control unit 404_3, and a timer unit 405. The mobile terminal 1 may be provided with at least some of the functions of the respective configuration units provided in the posting status notification server 4_3. For example, the mobile terminal 1 may be provided with the function of the control unit 404_3 of the posting status notification server 4_3.

The memory unit 403_3 includes a posting information table 431, a posting status analysis result table 432, a content data table 433, a content associated hashtag table 434, and a posting hashtag table 435.

The configuration of the content data table 433 is similar to that of the content data table 231 shown in FIG. 6, and therefore, detailed description thereof is omitted.

FIG. 17 is a diagram showing an example of the content associated hashtag table 434.

The content associated hashtag table 434 is a table that associates content keyword information, information that indicates a registered hashtag, and information that indicates a relevant word, and that stores each of the pieces of information.

Content keyword information is a piece of information included in content-accompanying information that is stored in the content data table 433. In the case where content-accompanying information includes several pieces of content keyword information, each of the several pieces of content keyword information is stored in each row field of the content associated hashtag table 434. That is to say, in the field of each row of the content associated hashtag table 434, there is stored a single content keyword piece of information.

A registered hashtag is a piece of information that indicates corresponding content keyword information using a hashtag.

A relevant word is a keyword that is relevant to content keyword information. This relevant word is a terminology that is likely to be written in posting information by users that are interested in the content keyword information.

FIG. 18 is a diagram showing an example of the posting hashtag table 435.

The posting hashtag table 435 is a table that associates information indicating a posting hashtag and information indicating the number of posts, and that stores them. This posting hashtag table 435 is a table that stores hashtags collected for each posting time slot of posting information, and the number of posts thereof. These posting hashtags are hashtags that are included in the posting information posted in a predetermined time. FIG. 18 shows posting hashtags and the number of posts thereof, the posting time slot (broadcasting time slot) of which is between 19:00 and 20:00 on Aug. 8, 2012.

As shown in FIG. 16, the control unit 404_3 includes a posting information acquisition unit 441, an analysis unit 442, a notification control unit 443, a registration unit 444, a collection unit 445, a decision unit 446, and a search unit 447.

The registration unit 444 receives information associated with each of the rows of the posting information table 331 that is received from the posting information management server 3, and registers the received information in the posting information table 431 of the memory unit 403_3.

The collection unit 445, at predetermined timing, collects posting information stored in the posting information table 431, and calculates the number of posts for each hashtag included in posting information.

This collection unit 445, if a collection result is obtained, associates the posting hashtag acquired from the posting information and the number of posts thereof, and writes them in the posting hashtag table 435.

Based on the hashtag request signal received from the mobile terminal 1, the decision unit 446 decides a hashtag that corresponds to the received hashtag request signal. That is to say, the decision unit 446 decides a hashtag to be displayed on the display 104 of the mobile terminal 1, based on the hashtag request signal. In the present exemplary embodiment, as the hashtag deciding method, the decision unit 446 executes either one of the following two methods, or a method that combines both methods. The types of deciding method to be executed are preliminarily set.

The first deciding method is a deciding method such that the decision unit 446 decides a registered hashtag that is registered in the content associated hashtag table 434 as a hashtag that corresponds to the received hashtag request signal. The first deciding method is hereunder referred to as registered hashtag deciding method.

The second deciding method is a deciding method such that the decision unit 446 decides a posting hashtag that is registered in the posting information table 431 as a hashtag that corresponds to the received hashtag request signal. The second deciding method is hereunder referred to as posting hashtag deciding method.

An example of the registered hashtag deciding method is described.

The decision unit 446 determines whether or not the hashtag request signal includes a content ID. To describe specifically, in the case where the hashtag request signal includes a content ID, the decision unit 446 makes reference to the content data table 433 of the memory unit 403_3, and acquires content-accompanying information that corresponds to this content ID. At this time, the decision unit 446 may acquire content-accompanying information that corresponds to both the broadcasting time slot indicated by the date and time at which the hashtag request signal is received, and the content ID included in the hashtag request signal.

Moreover, the decision unit 446 makes reference to the content associated hashtag table 434 of the memory unit 403_3, and acquires the registered hashtag that corresponds to the content keyword information included in the acquired content-accompanying information. The decision unit 446 decides the acquired registered hashtag as a hashtag that corresponds to the received hashtag request signal.

An example of the posting hashtag deciding method is described.

As with the description above, in the case where the hashtag request signal includes a content ID, the decision unit 446 makes reference to the content data table 433 of the memory unit 403_3, and acquires content-accompanying information that corresponds to this content ID.

This decision unit 446 makes reference to the content associated hashtag table 434 of the memory unit 403_3, and acquires the relevant word that corresponds to the content keyword information included in the acquired content associated information. The decision unit 446 makes reference to the posting information table 431, and searches for posting information that includes the acquired relevant word. In the case where posting information including the acquired relevant word is obtained by means of the search, the decision unit 446 makes reference to the posting information table 431 and acquires the posting hashtag included in the posting information obtained as a result of the search. The decision unit 446 decides the acquired posting hashtag as a hashtag that corresponds to the received hashtag request signal.

Based on the posting browsing request signal received from the mobile terminal 1, the search unit 447 searches for posting information corresponding to the posting browsing request signal. To describe specifically, the search unit 447 makes reference to the posting information table 431, and searches for posting information that is associated with the same content associated information as the hashtag included in the posting browsing request signal. Then, the search unit 447 transmits this search result to the mobile terminal 1.

Figure 19:
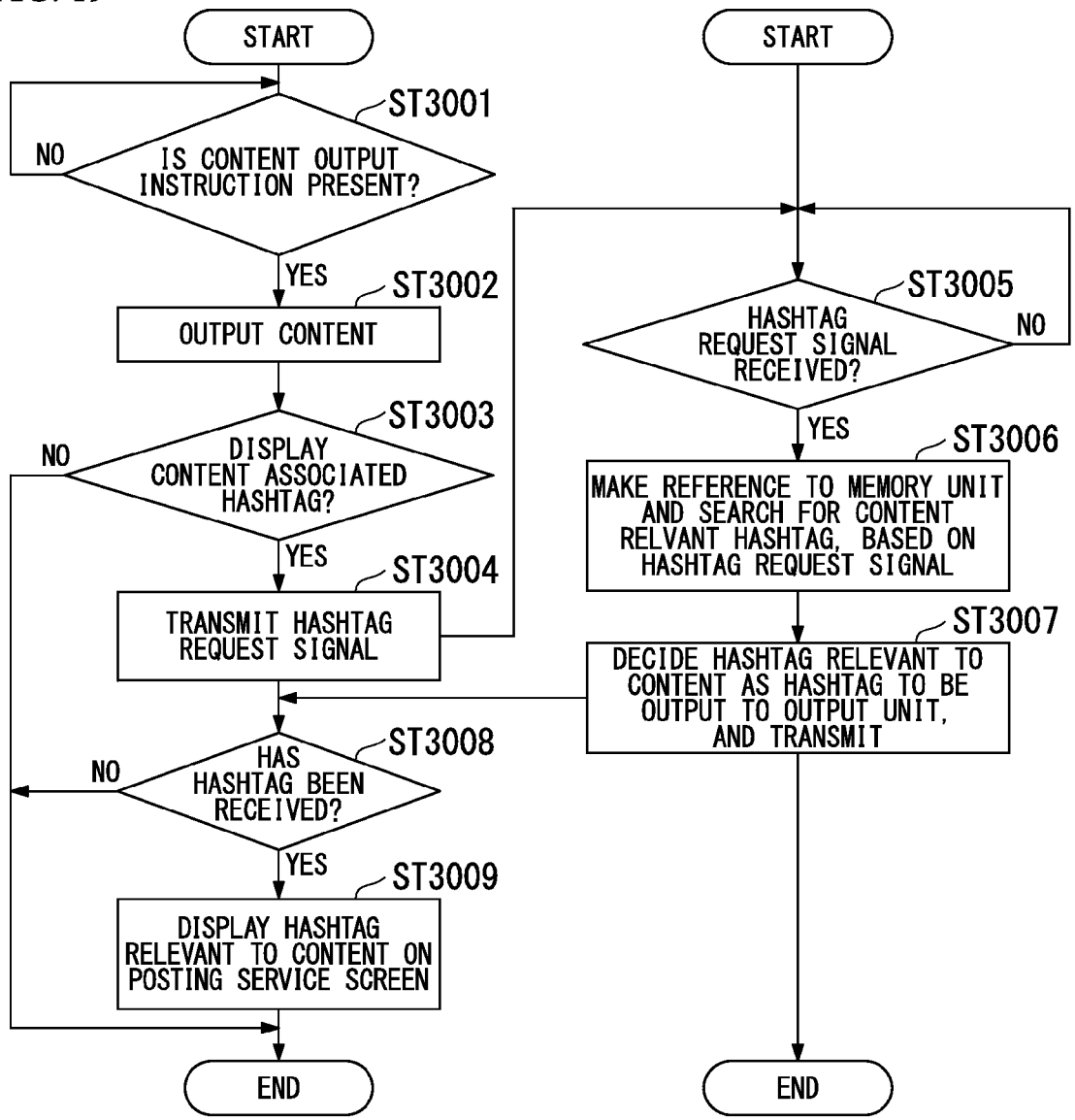
FIG. 19 is for describing an example of an information processing method according to the third exemplary embodiment of the present invention.

Next is described an example of an information processing method in an information processing system according to the present exemplary embodiment, with reference to FIG. 19. In the flowchart shown in FIG. 19, as an example, there is described a case where the mobile terminal 1 and the posting status notification server 4_3 execute the respective processes in cooperation with each other. However, the exemplary embodiment of the present invention is not limited to this example. If the mobile terminal 1 is provided with at least some of the functions of the respective configuration units provided in the posting status notification server 4_3, the mobile terminal 1 may execute all of the processes. Moreover, if the posting status notification server 4_3 is provided with at least some of the functions of the respective configuration units provided in the mobile terminal 1, the posting status notification server 4_3 may execute all of the processes.

The left side of FIG. 19 shows the process flow of the mobile terminal 1 (steps ST3001 through ST3004, and ST3008 through ST3009). The right side of FIG. 19 shows the process flow of the posting status notification server 4_3 (steps ST3005 through ST3007).

(Step ST3001)

The operation content determination unit 121 of the control unit 102 of the mobile terminal 1 determines whether or not a content output instruction has been input on the touch panel 101. For example, when an operation to instruct the display 104 to display television broadcasting is input, the operation content determination unit 121 determines an input of television broadcasting content output instruction as having been made, and outputs the determination result to the output control unit 122. Here, if the television broadcasting content to be displayed is a content that is currently being broadcasted, the channel is specified as an output instruction. If the television broadcasting content to be displayed is a content that has been previously broadcasted and recorded, the content is specified as an output instruction.

(Step ST3002)

Based on the determination result accepted from the operation content determination unit 121, the output control unit 122 causes the display 104 and/or the audio signal processing unit 124 to output the content. This output control unit 122 may, for example, cause the display 104 to display the television broadcasting image, based on the content data received by the broadcasting data control unit 123 via the television broadcasting receiving unit 106. If the television broadcasting content data includes audio and audio output is set to be performed, the output control unit 122 outputs the audio data included in the content data to the audio signal processing unit 124, and causes the speaker 191 to output the audio.

(Step ST3003)

Based on the operation content accepted by the touch panel 101, the output control unit 122 determines whether or not to cause the display 104 to display the hashtag relevant to the content that can be output. In other words, based on the operation content accepted by the touch panel 101, the posting unit 125 determines whether or not to create a hashtag request signal that requests the posting status notification server 4_3 for the hashtag relevant to the content that can be output.

In the present exemplary embodiment, the timing of displaying the hashtag relevant to the content that can be output is preliminarily decided. For example, this timing may be the timing at which, in the state where the content display screen is displayed on the display 104, the mobile terminal 1 accepts an operation from the user to instruct the display 104 to display this content display screen and the posting screen at the same time.

For example, this display timing may be the timing at which, in the state where the content display screen is displayed on the display 104, the mobile terminal 1 accepts an operation from the user to instruct to start a social networking service such as Twitter (registered trademark).

For example, this display timing may be the timing at which, in the state where the content display screen and the posting screen are displayed on the display 104 at the same time, the type of the content being displayed on the content display screen is changed.

For example, this display timing may be the timing at which, in the state where the content display screen and the posting screen are displayed on the display 104 at the same time, the mobile terminal 1 accepts an operation from the user to post posting information.

Even in the case other than those described above where the content can be displayed on the display 104 or the content can be output from the speaker 191, this display timing may be the timing of starting posting of the posting information, the timing of inputting posting information, the timing of posting posting information, or the timing of finishing posting of posting information, and it is the timing at which a predetermined program for executing these operations is being executed.

(Step ST3004)

If the output control unit 122 determines to display the hashtag relevant to the content, the posting unit 125 creates a hashtag request signal. Furthermore, the posting unit 125 transmits the hashtag request signal to the posting status notification server 4_3 via the communication unit 107.

Based on the content displayed on the display 104 and/or the content output from the speaker 191, this posting unit 125 creates a hashtag request signal.

For example, in the case where the user of the mobile terminal 1 is watching relayed broadcasting of a soccer game from a broadcasting station A at 19:30, Aug. 8, 2012, the posting unit 125 creates a hashtag request signal that includes a content ID "C001" indicating this program and information that indicates a terminal ID indicating the mobile terminal 1, and transmits the signal to the posting status notification server 4_3 via the communication unit 107.

(Step ST3005)

The posting status notification server 4_3 determines whether or not the hashtag request signal has been received.
(Step ST3006)

In the case where the communication unit 402 of the posting status notification server 4_3 has received the hashtag request signal, based on the hashtag request signal, the decision unit 446 of the control unit 404_3 decides a hashtag that corresponds to the received hashtag request signal.

If the process by means of the registered hashtag deciding method is set, the decision unit 446 decides a registered hashtag that is registered in the content associated hashtag table 434 as a hashtag that corresponds to the received hashtag request signal.

To describe specifically, the decision unit 446 makes reference to the content data table 433 of the memory unit 403_3, and acquires content-accompanying information that corresponds to the content ID "C001" included in the hashtag request signal. Here, it is assumed that the decision unit 446 acquired "soccer, women's soccer" as content-accompanying information that corresponds to the content ID "C001".

In this case, the decision unit 446 then makes reference to the content associated hashtag table 434, and acquires a registered hashtag that corresponds to the same content keyword information as the content-accompanying information "soccer, women's soccer". For example, the decision unit 446 acquires a registered hashtag "#soccer" that corresponds to the same content keyword information as the content-accompanying information. The decision unit 446 decides the registered hashtag "#soccer" as a hashtag that corresponds to the received hashtag request signal.

If the process by means of the posting hashtag deciding method is set, the decision unit 446 decides content associated information that is registered in the posting information table 431 as a hashtag that corresponds to the received hashtag request signal.

To describe specifically, the decision unit 446 makes reference to the content data table 433 of the memory unit 403_3, and acquires content-accompanying information that corresponds to the content ID "C001" included in the hashtag request signal.

Here, it is assumed that the decision unit 446 acquired "soccer, women's soccer" as content-accompanying information that corresponds to the content ID "C001".

In this case, the decision unit 446 then makes reference to the content associated hashtag table 434, and acquires relevant words that correspond to the same content keyword information as the content-accompanying information "soccer" and "women's soccer" respectively. For example, the decision unit 446 acquires relevant words "soccer, field, goal keeper, defender, midfielder, forward, volante . . . " that correspond to the content-accompanying information "soccer".

Then the decision unit 446 makes reference to the posting information table 431, and searches for posting information that includes any one of the acquired relevant words "soccer, field, goal keeper, defender, midfielder, forward, volante . . . ".

In the present exemplary embodiment, as shown in FIG. 8, the posting information table 431 stores posting information associated with the content associated information that includes the relevant word "soccer". Accordingly, the decision unit 446 makes reference to the posting information table 431 and acquires the posting hashtag included in the posting information obtained as a result of the search.

The decision unit 446 decides the acquired posting hashtag as a hashtag that corresponds to the received hashtag request signal.
(Step ST3007)

The decision unit 446 decides to output the acquired registered hashtag or posting hashtag to the output unit of the mobile terminal 1, and transmits the hashtag to the mobile terminal 1 indicated by the terminal ID included in the hashtag request signal.
(Step ST3008)

The mobile terminal 1 determines whether or not the hashtag transmitted from the posting status notification server 4_3 has been received.
(Step ST3009)

The mobile terminal 1 displays the received hashtag in the posting information display region 1042.

As described above, according to the information processing system of the present exemplary embodiment, if it is determined to display the hashtag relevant to the content in the state of outputting the content, the mobile terminal 1 can output the hashtag relevant to this content from the output unit.

As a result, for example, if the user instructs to display the display screen of the posting service such as Twitter (registered trademark), the user is editing posting information, or the user is browsing posting history, in the state where a television broadcasting content is being displayed on the display 104 of the mobile terminal 1, it is possible to display the hashtag corresponding to the television content being displayed. Moreover, it is possible to display a hashtag that corresponds to the television content that can be displayed, such as a competing program. Therefore, in the state of viewing the television, when posting information on the television program the user is viewing, the user can input a hashtag as posting information by specifying the displayed hashtag, without having to key input the relevant hashtag.

Moreover, by displaying a posting hashtag on the display 104, the mobile terminal 1 can also display a hashtag that has not been registered and that has naturally occurred, according to the content.

Furthermore, the mobile terminal 1 can display a posting hashtag with a large number of posts preferentially on the display 104. As a result, it is possible to display a hashtag used more frequently by users, and prevent a hashtag having a low level of relevance to the content from being displayed.

In general, when key inputting a hashtag, there is a possibility of a false input. In contrast, according to the exemplary embodiment of the present invention, hashtag candidates are displayed on the display 104, and the displayed hashtag may be specified, and therefore, a false hashtag input can be prevented.

In the present exemplary embodiments, the touch panel 101 and the display 104 are described as being a configuration included in the touch panel 101. However, the exemplary embodiments of the present invention are not limited to this example. For example, the display 104 may be a display with no touch sensor equipped therein, and the touch panel 101 may be an operation means such as a mouse, a keyboard, or a button.

The posting-status notification systems 100, 200, the mobile terminal 1, the content distribution server 2, the posting information management server 3, and the posting status notification servers 4, 4_3 of the exemplary embodiments of the present invention may internally have a computer system. The operation process of these systems may be stored in a program format on a computer-readable recording medium, and the above processes may be performed by reading and executing this program on a computer system. The "computer system" here includes a CPU, various types of memory, an operating system, and hardware such as a peripheral device.

The "computer system" also includes a homepage provision environment (or display environment) in the case of using a WWW system.

A process for calculating an estimated value of shape information of a detection target object may be performed by recording a program for realizing the respective steps on a computer-readable recording medium, recording a program for realizing this function on a computer-readable recording medium, and reading and executing the program recorded on this recording medium.

The "computer-readable recording medium" includes a flexible disk, a magnetic optical disk, a ROM, a writable nonvolatile memory such as a flash memory, a movable medium such as a CD-ROM, and a built-in hard disk drive of a computer system.

Furthermore, the "computer-readable recording medium" includes one that retains a program for a certain period of time such as a built-in volatile memory (for example, DRAM (dynamic random access memory)) of a computer system that serves as a server and/or a client in the case where the program is transmitted via a network such as the Internet or a communication line such as a telephone line.

The above program may be transmitted from a computer system having this program stored on a memory device to another computer system via a transmission medium or by means of transmission waves within the transmission medium. The "transmission medium" that transmits the program includes a medium having a function of transmitting information such as a network including the Internet (communication network), and a communication line including a telephone line (communication line).

The above program may realize part of the functions described above.

The above program may be of a so-called difference file (difference program) that can realize the above functions in combination with a program that is already recorded on a computer system.

Minimum constituents of a posting-status notification system according to an exemplary embodiment of the present invention are a notification control unit (determination unit, instruction unit) that determines whether or not the posting status of content-associated posting information in posting information posted on a network satisfies a predetermined notification condition, and that instructs an output unit to output the posting status in the case where the posting status is determined as satisfying the notification condition. This configuration is shown in FIG. 14 and FIG. 15.

The posting-status notification system may be configured with a mobile terminal 1 and a posting status notification server 4, and it may also be configured with a mobile terminal 1 only.

It is possible to appropriately replace the constituents in the above exemplary embodiments with commonly known constituents without departing from the scope of the present invention. Moreover, the technical scope of the invention is not limited to the above exemplary embodiments, and various types of modifications may be made without departing from the scope of the invention.

This application is based upon and claims the benefit of priority from Japanese patent application No. 2012-212861, filed Sep. 26, 2012, the disclosure of which is incorporated herein in its entirety by reference.

INDUSTRIAL APPLICABILITY

The present invention may be applied to a posting-status notification system, an information communication terminal, a posting-status notification method, and a program.

REFERENCE SYMBOLS

1 Mobile terminal
2 Content distribution server
3 Posting information management server
4 Posting status notification server
5 Wireless communication network
6 Internet
7 Mobile terminal
8 Transmission antenna
9 Recording medium
10 External device
101 Touch panel
102 Control unit
103 Memory unit
104 Display
105 Antenna
106 Television broadcasting receiving unit
107 Communication unit
108 Timer
109 Notification unit
121 Operation content determination unit
122 Output control unit
123 Broadcasting data control unit
124 Audio signal processing unit
125 Posting unit
191 Speaker
192 Light emitting unit
193 Vibration unit
441 Posting information acquisition unit
442 Analysis unit
443 Notification control unit (determination unit, instruction unit)

What is claimed is:

1. A posting-status notification system comprising:
a memory having stored thereon computer program code; and
a processor configured access the memory and execute the computer program code to:
determine a broadcasting content associated with posting information, among broadcasting contents currently broadcasted, the posting information being posting information posted on a network;
acquire a content-associated information indicating the broadcasting content;
determine whether or not a posting status of a plurality of pieces of posting information being associated with the broadcasting content satisfies a predetermined notification condition, the notification condition being a case where the posting status is highly active in the broadcasting contents currently broadcasted; and
instruct an output unit to output the posting status and the content-associated information in a case where the processor determines that the posting status satisfies the notification condition.

2. The posting-status notification system according to claim 1, wherein the processor is further configured to execute the computer program code to:
  receive at least the posting information associated with the broadcasting content; and
  analyze the posting status with respect to the broadcasting content, based on the posting information associated with the broadcasting content and received by the processor, and posting time information indicating time at which the posting information was posted.

3. The posting-status notification system according to claim 2, wherein the processor is further configured to execute the computer program code to:
  calculate the number of posts per unit time with respect to the broadcasting content,
  determine whether or not the calculated number of posts is great than or equal to a predetermined threshold value, and
  determine that the posting status satisfies the notification condition when determines that the calculated number of posts is greater than or equal to the threshold value.

4. The posting-status notification system according to claim 2, wherein the processor is further configured to execute the computer program code to:
  calculate a change rate of the number of posts per unit time with respect to the broadcasting content,
  determine whether or not the calculated change rate is great than or equal to a predetermined threshold value, and
  determine that the posting status satisfies the notification condition when determines that the calculated change rate is greater than or equal to the threshold value.

5. The posting-status notification system according to claim 2, wherein the processor is further configured to execute the computer program code to:
  count the number of posts of the posting information posted from time of starting the broadcasting content, based on the posting information which was posted and is associated with a broadcasting content reproduction time from the time of starting the broadcasting content, and
  determine whether or not the counted number of posts is great than or equal to a predetermined threshold value, and
  determine that the posting status satisfies the notification condition when determines that the counted number of posts is greater than or equal to the threshold value.

6. The posting-status notification system according to claim 2, wherein the processor is further configured to execute the computer program code to:
  instruct the output unit to output the broadcasting content for which the posting status is determined as satisfying the notification condition when the processor determines that the posting status satisfies the notification condition.

7. An information communication terminal comprising:
  a memory having stored thereon computer program code; and
  a processor configured access the memory and execute the computer program code to:
    determine a broadcasting content associated with posting information, among broadcasting contents currently broadcasted, the posting information being posting information posted on a network;
    acquire a content-associated information indicating the broadcasting content;
    determine whether or not a posting status of a plurality of pieces of posting information being associated with the broadcasting content satisfies a predetermined notification condition, the notification condition being a case where the posting status is highly active in the broadcasting contents currently broadcasted; and
    instruct an output unit to output the posting status and the content-associated information in a case where the processor determines that the posting status satisfies the notification condition, and
  an output unit that outputs the posting information by means of at least any one of sound, light, vibration, and image when the processor instructs an output of the posting status.

8. The information communication terminal according to claim 7, wherein the processor is further configured to execute the computer program code to:
  release restriction on an operation that instructs reproduction of a broadcasting content of the posting status in a case where the posting status is output by the output unit in a state where operation input to the information communication terminal is restricted.

9. A posting-status notification method comprising the steps of:
  determining a broadcasting content associated with posting information, among broadcasting contents currently broadcasted, the posting information being posting information posted on a network;
  acquiring a content-associated information indicating the broadcasting content;
  determining whether or not a posting status of a plurality of pieces of posting information being associated with the broadcasting content satisfies a predetermined notification condition, the notification condition being a case where the posting status is highly active in the broadcasting contents currently broadcasted; and
  instructing an output unit to output the posting status and the content-associated information in a case where it is determined that the posting status satisfies the notification condition.

10. A non-transitory computer-readable recording medium storing a program that causes a computer to execute the following steps:
  determining a broadcasting content associated with posting information, among broadcasting contents currently broadcasted, the posting information being posting information posted on a network;
  acquiring a content-associated information indicating the broadcasting content;
  determining whether or not a posting status of a plurality of pieces of posting information being associated with the broadcasting content satisfies a predetermined notification condition, the notification condition being a case where the posting status is highly active in the broadcasting contents currently broadcasted; and
  instructing an output unit to output the posting status and the content-associated information in a case where it is determined that the posting status satisfies the notification condition.

* * * * *